United States Patent
Torimizu et al.

(10) Patent No.: US 9,343,775 B2
(45) Date of Patent: May 17, 2016

(54) NONAQUEOUS ELECTROLYTE COMPOSITION AND NONAQUEOUS ELECTROLYTE BATTERY

(75) Inventors: Yumiko Torimizu, Fukushima (JP);
Haruo Watanabe, Kanagawa (JP);
Fumihata Yamamoto, Fukushima (JP);
Masaki Machida, Fukushima (JP); Yuki Ogawa, Fukushima (JP)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 13/033,113

(22) Filed: Feb. 23, 2011

(65) Prior Publication Data
US 2011/0217600 A1    Sep. 8, 2011

(30) Foreign Application Priority Data
Mar. 2, 2010  (JP) ................................ P2010-044802

(51) Int. Cl.
| H01M 10/056 | (2010.01) |
| H01M 10/0561 | (2010.01) |
| H01M 10/052 | (2010.01) |
| H01M 10/0525 | (2010.01) |
| H01M 10/0568 | (2010.01) |

(52) U.S. Cl.
CPC ........ *H01M 10/0561* (2013.01); *H01M 10/052* (2013.01); *H01M 10/056* (2013.01); *H01M 10/0525* (2013.01); *H01M 10/0568* (2013.01); *Y02E 60/122* (2013.01)

(58) Field of Classification Search
CPC .................................................... H01M 10/056
See application file for complete search history.

(56) References Cited

U.S. PATENT DOCUMENTS

| 4,102,931 | A | * | 7/1978 | Buchholz ........................ 568/73 |
| 4,630,176 | A |   | 12/1986 | Cuellar et al. |
| 4,633,372 | A |   | 12/1986 | Calahan et al. |
| 5,501,922 | A |   | 3/1996 | Li et al. |
| 6,063,142 | A | * | 5/2000 | Kawakami et al. .......... 29/623.5 |
| 6,225,009 | B1 |   | 5/2001 | Fleischer et al. |
| 6,387,230 | B1 | * | 5/2002 | Murphy et al. ............... 204/296 |
| 6,395,428 | B1 |   | 5/2002 | Kezuka |
| 6,677,083 | B2 |   | 1/2004 | Suzuki et al. |
| 6,905,796 | B2 | * | 6/2005 | Ishida et al. .................. 429/209 |
| 8,652,577 | B2 |   | 2/2014 | Watanabe et al. |
| 2004/0101757 | A1 | * | 5/2004 | Kii et al. ....................... 429/253 |
| 2006/0081530 | A1 | * | 4/2006 | Beard .................... 210/500.27 |
| 2007/0099051 | A1 |   | 5/2007 | Hocevar et al. |

(Continued)

FOREIGN PATENT DOCUMENTS

| CN | 1950970 | 4/2007 |
| CN | 10150599 | 8/2009 |

(Continued)

OTHER PUBLICATIONS

Japanese Patent Office, Office Action issued in connection with Japanese Patent Application No. 2010-044802, dated Oct. 1, 2013. (5 pages).

(Continued)

*Primary Examiner* — Jeremiah Smith
(74) *Attorney, Agent, or Firm* — K&L Gates LLP

(57) ABSTRACT

A nonaqueous electrolyte battery is provided and includes a positive electrode, a negative electrode, and an electrolyte. The electrolyte contains a nonaqueous solvent, an electrolyte salt, a matrix polymer and a ceramic powder, and further contains a polyacid and/or a polyacid compound.

16 Claims, 11 Drawing Sheets

(56) References Cited

U.S. PATENT DOCUMENTS

| | | | |
|---|---|---|---|
| 2007/0178384 A1 | 8/2007 | Kajita et al. | |
| 2008/0245735 A1* | 10/2008 | Hennige et al. | 210/650 |
| 2008/0318130 A1* | 12/2008 | Ogawa et al. | 429/231.95 |
| 2009/0092900 A1 | 4/2009 | Obana et al. | |
| 2009/0197184 A1* | 8/2009 | Kawashima | 429/331 |
| 2009/0208840 A1* | 8/2009 | Ogasawara et al. | 429/207 |
| 2009/0229822 A1* | 9/2009 | Hutchins et al. | 166/283 |
| 2009/0297911 A1* | 12/2009 | Moore et al. | 429/33 |
| 2011/0014544 A1* | 1/2011 | Lee et al. | 429/492 |

FOREIGN PATENT DOCUMENTS

| | | |
|---|---|---|
| JP | 59-060818 | 4/1984 |
| JP | 62-090863 | 4/1987 |
| JP | 01-200572 | 8/1989 |
| JP | 01-264172 | 10/1989 |
| JP | 06-140052 | 5/1994 |
| JP | 08-213008 | 8/1996 |
| JP | 10-255842 | 9/1998 |
| JP | 2000-164254 | 6/2000 |
| JP | 2001-283917 | 10/2001 |
| JP | 2002-507310 | 3/2002 |
| JP | 2002-289188 | 10/2002 |
| JP | 2004-214116 | 7/2004 |
| JP | 2004-342424 | 12/2004 |
| JP | 2007-131596 | 5/2007 |
| JP | 2007-511873 | 5/2007 |
| JP | 2007-188777 | 7/2007 |
| JP | 2009-087889 | 4/2009 |
| JP | 2009-107990 | 5/2009 |
| WO | WO 2009069854 * 6/2009 ............ H01M 8/10 |

OTHER PUBLICATIONS

Chinese Office Action issued May 6, 2014, for corresponding Chinese Appln. No. 201110044048.9.

* cited by examiner

1

NONAQUEOUS ELECTROLYTE COMPOSITION AND NONAQUEOUS ELECTROLYTE BATTERY

CROSS REFERENCES TO RELATED APPLICATIONS

The present application claims priority to Japanese Patent Application JP 2010-044802 filed on Mar. 2, 2010, the entire contents of which is hereby incorporated by reference.

BACKGROUND

The present disclosure relates to a nonaqueous electrolyte composition and to a nonaqueous electrolyte battery. In particular, the present disclosure relates to a nonaqueous electrolyte battery in which a specified ceramic powder is contained in a nonaqueous electrolyte.

Batteries occupy an important position as a power source of portable type electronic appliances. In order to realize downsizing and weight reduction of an appliance, the batteries are required to be reduced in weight, and furthermore, batteries capable of effectively using a housing space within an appliance are demanded. For the purpose of coping with such requirements, lithium secondary batteries having large energy density and output density are the most competent. Though the lithium secondary batteries have the foregoing high performances, they are required to have higher functions following the high performance of the appliance. However, in lithium secondary batteries using a lithium metal for a negative electrode, when charged, dendritic lithium (dendrite) is deposited on the surface of the negative electrode and grows due to a charge/discharge cycle. The growth of the dendrite deteriorates a charge/discharge cycle characteristic of the secondary battery and generates device blister.

Then, for example, as disclosed in JP-A-62-90863, a secondary battery in which a carbonaceous material such as cokes is used as a negative electrode, and charge/discharge is repeated by doping and dedoping an alkali metal ion is proposed. According to this, the foregoing deterioration of the negative electrode in repeating charge/discharge can be suppressed. However, even in this secondary battery, when the charge/discharge is repeated over a long period of time, device blister is generated, and therefore, more suppression of the device blister is desired.

SUMMARY

It is desirable to provide a nonaqueous electrolyte composition and a nonaqueous electrolyte battery, each of which is able to suppress device blister.

According to one embodiment, there is provided a nonaqueous electrolyte battery including a positive electrode, a negative electrode and an electrolyte, wherein the electrolyte contains a nonaqueous solvent, an electrolyte salt, a matrix polymer and a ceramic powder and further contains a polyacid and/or a polyacid compound.

According to another embodiment, there is provided a nonaqueous electrolyte battery including a positive electrode, a negative electrode and an electrolyte, wherein the electrolyte contains a nonaqueous solvent, an electrolyte salt, a matrix polymer and a ceramic powder, and a coating film in a gel form containing an amorphous polyacid and/or polyacid compound containing at least one polyelement is formed on the surface of at least a part of the negative electrode.

According to another embodiment, there is provided a nonaqueous electrolyte composition containing an electrolyte salt, a nonaqueous solvent, a matrix polymer, a ceramic powder and a polyacid and/or a polyacid compound.

In the embodiments, since the polyacid and/or the polyacid compound is incorporated into the battery, by repeating charge/discharge, a coating film containing the polyacid and/or the polyacid compound is formed on a negative electrode surface. According to this, it may be supposed that the battery blister to be caused due to repetition of charge/discharge is suppressed. Furthermore, by adding the ceramic powder to the electrolyte, the negative electrode surface is uniformly covered by the ceramic powder. According to this, it may be supposed that a more stable coating film containing the polyacid and/or the polyacid compound is formed and that the device blister to be caused due to repetition of charge/discharge is more suppressed.

As described above, according to the embodiments, since not only the polyacid and/or the polyacid compound is incorporated into the battery, but the ceramic powder is added to the electrolyte, the battery blister can be suppressed.

Additional features and advantages are described herein, and will be apparent from the following Detailed Description and the figures.

DETAILED DESCRIPTION

Figure 1:
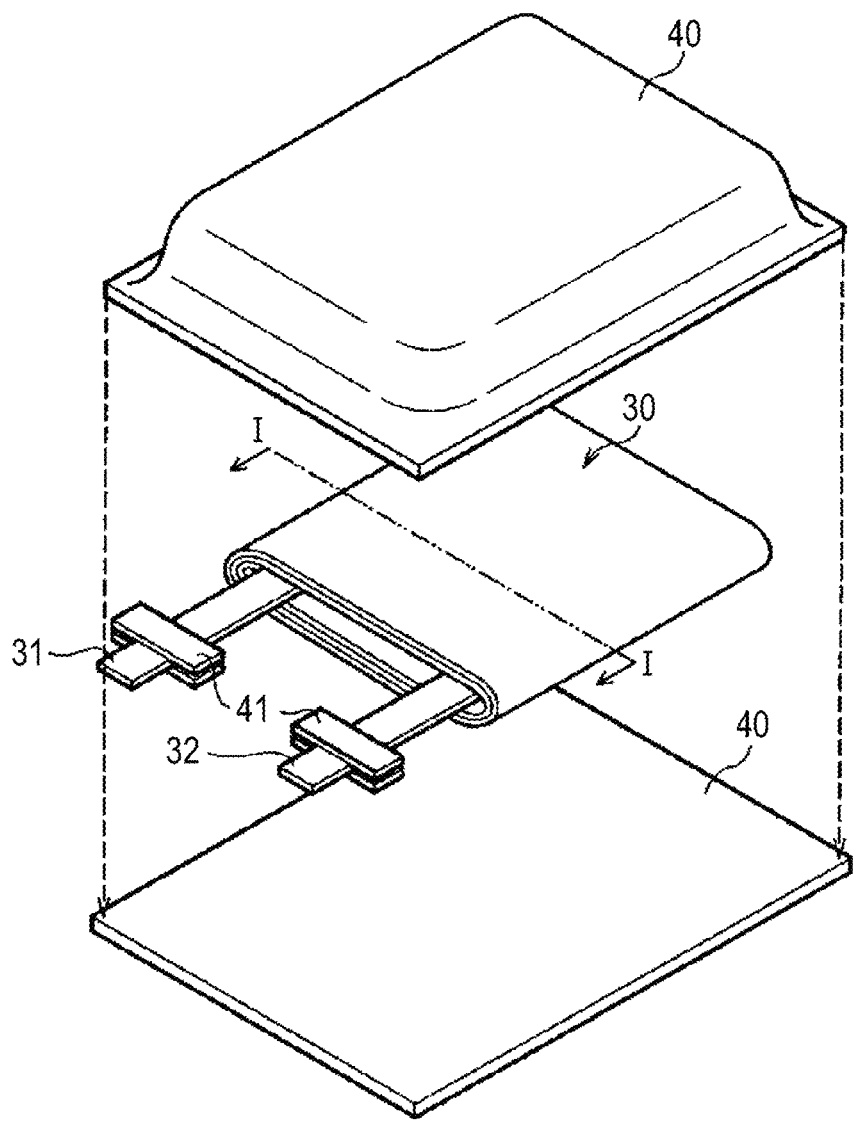
FIG. 1 is an exploded perspective view showing a configuration example of a nonaqueous electrolyte battery according a second embodiment.

Embodiments are hereunder described by reference to the accompanying drawings. The description is made in the following order.

1. First embodiment (an example of a nonaqueous electrolyte composition containing a ceramic powder)
2. Second embodiment (a first example of a nonaqueous electrolyte battery using a nonaqueous electrolyte composition containing a ceramic powder)
3. Third embodiment (a second example of a nonaqueous electrolyte battery)
4. Fourth embodiment (a third example of a nonaqueous electrolyte battery)
5. Fifth embodiment (an example of a nonaqueous electrolyte battery using a polyacid and/or a polyacid compound)

<1. First Embodiment>

[Constitution of Nonaqueous Electrolyte]

A nonaqueous electrolyte composition according to a first embodiment contains an electrolyte salt, a nonaqueous solvent, a matrix polymer, a prescribed ceramic powder and a heteropolyacid and/or a heteropolyacid compound and is suitably used as a nonaqueous electrolyte of a lithium ion nonaqueous electrolyte secondary battery.

Here, the prescribed ceramic powder has an average particle size of from 0.1 μm to 2.5 μm and a BET specific surface area of from 0.5 to 11 $m^2/g$.

(Ceramic Powder)

As the ceramic powder, it is preferable to use aluminum oxide ($Al_2O_3$), zirconium oxide ($ZrO_2$), titanium oxide ($TiO_2$), magnesium oxide (MgO), silicon carbide (SiC), aluminum nitride (AlN) or boron nitride (BN) singly or in admixture. As zeolite, a molecular sieve represented by $MAlSi_2O_6$ (wherein M represents an alkyl metal such as Li, Na and K, or an alkaline earth metal such as Mg and Ca) or the like is preferably used.

Reasons why the foregoing ceramic species is favorable reside in the matters that such a ceramic can stably exist within the battery, does not adversely affect a battery reaction and has a large and favorable volume heat capacity.

Also, the ceramic powder is required to have an average particle size of from 0.1 to 2.5 μm. When the average particle size of the ceramic powder is less than 0.1 μm, there is a concern that the ceramic powder is aggregated. On the other hand, when the average particle size of the ceramic powder exceeds 2.5 μm, in a battery using a laminated film as a package member, there is a concern that a defective appearance is revealed.

Furthermore, when the BET specific surface area of the ceramic powder is less than 0.5 $m^2/g$, precipitation after dispersion tends to become fast, and there is a concern that the battery capacity or appearance is adversely affected. When the BET specific surface area of the ceramic powder exceeds 11 $m^2/g$, battery characteristics such as a cycle characteristic are lowered.

As the ceramic powder, one whose particle size distribution is gauss distribution is preferable. According to this, since a large amount of extremely large particles and extremely small particles are not incorporated, there are obtained such advantages that the productivity and battery characteristics are stable.

Also, in the nonaqueous electrolyte according to the first embodiment, a content ratio of the foregoing ceramic powder and the following matrix polymer is preferably 1/1 or more and not more than 5/1 in terms of a mass ratio.

When this ratio is less than 1/1, an effect to be brought by incorporating the ceramic powder is small, whereas when it exceeds 5/1, there is a concern that battery characteristics such as a cycle characteristic are not sufficient.

In a nonaqueous electrolyte secondary battery fabricated using the nonaqueous electrolyte according to the first embodiment, it is preferable that the ceramic powder exists in a proportion of from 0.6 to 3.5 $mg/cm^2$ per unit area between positive and negative electrodes, namely per area specified by a positive electrode and a negative electrode each having a unit area in a nonaqueous electrolyte portion interposed between the positive electrode and the negative electrode opposing to each other. When the proportion of the ceramic powder is less than 0.6 $mg/cm^2$, an effect to be brought by incorporating the ceramic powder is small, whereas when it exceeds 3.5 $mg/cm^2$, there is a concern that battery characteristics such as a cycle characteristic are not sufficient.

(Matrix Polymer)

The nonaqueous electrolyte according to the first embodiment contains a matrix polymer. An electrolyte salt, a nonaqueous solvent and a ceramic material are impregnated in or kept by this matrix polymer.

By swelling, gelation or non-fluidization of such a polymer compound, it is possible to effectively suppress the occurrence of liquid leakage of the nonaqueous electrolyte in the obtained battery.

Examples of such a matrix polymer include (1) polyvinyl formal, (2) a polyacrylate and (3) polyvinylidene fluoride represented by the following chemical formulae (1) to (3), respectively.

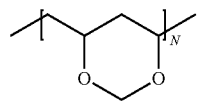

(1)

In the formula (1), N represents a degree of polymerization and is preferably from 100 to 10,000. When N is less than 100, the gelation is not sufficient, whereas when N exceeds 10,000, there is a concern that the viscosity is large, so that the capacity is lowered.

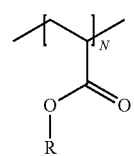

(2)

In the formula (2), R represents $C_nH_{2n-1}O_m$ (wherein n represents an integer of from 1 to 8; and m represents an integer of from 0 to 4); and N represents a degree of polymerization and is preferably from 100 to 10,000. When N is less than 100, the gelation is difficult, whereas when N exceeds 10,000, there is a concern that the fluidity is reduced.

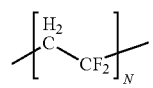

(3)

In the formula (3), N represents a degree of polymerization and is preferably from 100 to 10,000. When N is less than 100, the gelation is not sufficient, whereas when N exceeds 10,000, there is a concern that the viscosity is large, so that the capacity is lowered.

When polyvinylidene fluoride is contained in the matrix polymer, the matrix polymer preferably has a weight average molecular weight of 550,000 or more. When the weight average molecular weight of the matrix polymer is less than 550,000, there is a concern that the cycle characteristic is not sufficient.

A content of the matrix polymer is preferably from 0.1 to 5% by mass. When the content of the matrix polymer is less than 0.1% by mass, the gelation is difficult, and it is difficult to uniformly keep the ceramic powder; whereas when it exceeds 5% by mass, there is a possibility that influences such as a reduction of energy density are brought against the battery characteristics.

(Nonaqueous Solvent)

Examples of the nonaqueous solvent which is used for the nonaqueous electrolyte according to the first embodiment include various high-dielectric constant solvents and low-viscosity solvents.

As the high-dielectric constant solvent, ethylene carbonate, propylene carbonate and the like can be suitably used. However, the high-dielectric constant solvent is not limited thereto, and a cyclic carbonate such as butylene carbonate, vinylene carbonate, 4-fluoro-1,3-dioxolan-2-one (fluoroethylene carbonate), 4-chloro-1,3-dioxolan-2-one (chloroethylene carbonate) and trifluoromethyl ethylene carbonate can also be used.

Also, as the high-dielectric constant solvent, a lactone such as γ-butyrolactone and γ-valerolactone; a lactam such as N-methylpyrrolidone; a cyclic carbamate such as N-methyloxazolidinone; or a sulfone compound such as tetramethylene sulfone can be used in place of the cyclic carbonate or together with the cyclic carbonate.

Meanwhile, as the low-viscosity solvent, ethyl methyl carbonate, diethyl carbonate and the like can be suitably used. Besides, chain carbonates such as dimethyl carbonate and methyl propyl carbonate; chain carboxylates such as methyl acetate, ethyl acetate, methyl propionate, ethyl propionate, methyl butyrate, methyl isobutyrate, methyl trimethylacetate and ethyl trimethylacetate; chain amides such as N,N-dimethylacetamide; chain carbamates such as methyl N,N-diethylcarbamate and ethyl N,N-diethylcarbamate; and ethers such as 1,2-dimethoxyethane, tetrahydrofuran, tetrahydropyrane and 1,3-dioxolane can be used.

In the nonaqueous electrolyte according to the first embodiment, the foregoing high-dielectric constant solvent and low-viscosity solvent can be used singly, or two or more kinds thereof can be arbitrarily mixed and used.

Also, a content of the nonaqueous solvent is preferably from 70 to 90% by mass. When the content of the nonaqueous solvent is less than 70% by mass, there is a concern that the viscosity excessively increases, whereas when it exceeds 90% by mass, there is a concern that a sufficient conductivity is not obtainable.

(Electrolyte Salt)

As the electrolyte salt which is used for the nonaqueous electrolyte according to the first embodiment, any material is useful so far as it is dissolved or dispersed in the foregoing nonaqueous solvent to produce an ion. A lithium salt such as lithium hexafluorophosphate ($LiPF_6$) can be suitably used. However, needless to say, the electrolyte salt is not limited thereto.

That is, inorganic lithium salts such as lithium tetrafluoroborate ($LiBF_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$); lithium salts of perfluoroalkanesulfonic acid derivatives such as lithium trifluoromethanesulfonate ($LiCF_3SO_3$), lithium bis(trifluoromethanesulfone)imide ($LiN(CF_3SO_2)_2$), lithium bis(pentafluoroethanesulfone)methide ($LiC(C_2F_5SO_2)_2$) and lithium tris(trifluoromethanesulfone)methide ($LiC(CF_3SO_2)_3$); and the like can also be used. These materials can be used singly or in combinations of two or more kinds thereof.

In the case of a lithium salt, a concentration of such an electrolyte salt is preferably from 0.6 to 2.0 moles/kg.

When the concentration of the electrolyte salt is less than 0.6 moles/kg, there is a concern that a high battery capacity is not obtainable, whereas when it exceeds 2.0 moles/kg, there is a concern that the viscosity of the electrolytic solution is excessively high, so that favorable battery characteristics such as a low-temperature characteristic are not obtainable.

Though the nonaqueous electrolyte according to the first embodiment contains, as essential components, the foregoing ceramic powder, matrix polymer, nonaqueous solvent and electrolyte salt, other components can be added thereto.

Specifically, for example, the nonaqueous electrolyte can be combined with a carbonate having a multiple bond. According to this, a discharge capacity retention rate at the time of repetition of charge/discharge can be more enhanced.

As the carbonate having a multiple bond, typically, vinylene carbonate which is an example of a carbonate having a carbon-carbon multiple bond can be suitably used (more typically, a carbonate having a hydrocarbon group of a carbon-carbon multiple bond (for example, a carbon-carbon double bond or triple bond, etc.) can be exemplified). However, needless to say, the carbonate having a multiple bond is not limited thereto. That is, vinyl ethylene carbonate or the like can also be used.

Then, in the nonaqueous electrolyte according to the first embodiment, a content of the carbonate having a multiple bond is preferably from 0.05 to 5% by mass, more preferably from 0.1 to 3% by mass, and still more preferably from 0.2 to 2% by mass. When the content of the carbonate having a multiple bond is less than 0.05% by mass, the effect is not revealed, whereas when it exceeds 5% by mass, there is a concern that the discharge capacity is lowered.

(Heteropolyacid and Heteropolyacid Compound)

The heteropolyacid as referred to herein means a condensate of two or more kinds of an oxoacid. It is preferable that this heteropolyacid has a structure in which a heteropolyacid ion thereof is easily soluble in the solvent of the battery, such as a Keggin structure, an Anderson structure and a Dawson structure.

The heteropolyacid and/or the heteropolyacid compound is one having a polyatom selected from the following element group (a); or one having a polyatom selected from the following element group (a), in which a part of the polyatoms is substituted with at least any one element selected from the following element group (b).

Element group (a): Mo, W, Nb, V

Element group (b): Ti, Cr, Mn, Fe, Co, Ni, Cu, Zn, Ga, Zr, Tc, Rh, Cd, In, Sn, Ta, Re, Tl, Pb Also, the heteropolyacid and/or the heteropolyacid compound is one having a hetero atom selected from the following element group (c); or one having a hetero atom selected from the following element group (c), in which a part of the hetero atoms is substituted with at least any one element selected from the following element group (d).

Element group (c): B, Al, Si, P, Cr, Mn, Fe, Co, Ni, Cu, Zn, Ge, As

Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, Np Specific examples of the heteropolyacid include heteropolytungstic acids such as phosphotungstic acid and silicotungstic acid; and heteropolymolybdic acids such as phosphomolybdic acid and silicomolybdic acid. Examples of the heteropolyacid compound include heteropolytungstic acid compounds such as sodium silicotungstate, sodium phosphotungstate and ammonium phosphotungstate. Also, examples of the heteropolyacid compound include heteropolymolybdic acid compounds such as sodium phosphomolybdate and ammonium phosphomolybdate. Such a heteropolyacid or heteropolyacid compound may be used in admixture of two or more kinds thereof. Such a heteropolyacid or heteropolyacid compound is easily soluble in the solvent, is stable in the battery and is hard to give adverse influences such as a reaction with other material.

(Behavior of Heteropolyacid and/or Heteropolyacid Compound by Charge)

In the nonaqueous electrolyte battery using an electrolytic solution containing a heteropolyacid and/or a heteropolyacid compound, a coating film derived from the heteropolyacid and/or the heteropolyacid compound is formed on the negative electrode by initial charge or preliminary charge.

That is, the heteropolyacid and/or the heteropolyacid compound is electrolyzed by charge or preliminary charge, whereby a compound derived from the heteropolyacid and/or the heteropolyacid compound is deposited on the surface of the negative electrode to form an inorganic coating film.

Also, the heteropolyacid and/or the heteropolyacid compound in the electrolytic solution is electrolyzed by charge or preliminary charge depending upon the addition amount of the heteropolyacid and/or the heteropolyacid compound, whereby a compound derived from the heteropolyacid and/or the heteropolyacid compound is deposited on the surface of the positive electrode to form an inorganic coating film.

Also, in view of the fact that the electrolytic solution having the heteropolyacid and/or the heteropolyacid compound dissolved therein is impregnated in a negative electrode active material layer, a compound derived from the heteropolyacid and/or the heteropolyacid compound may be deposited within the negative electrode active material layer by charge or preliminary charge. According to this, the compound derived from the heteropolyacid and/or the heteropolyacid compound may exist among negative electrode active material particles.

Also, in view of the fact that the electrolytic solution having the heteropolyacid and/or the heteropolyacid compound dissolved therein is impregnated in a positive electrode active material layer, a compound derived from the heteropolyacid and/or the heteropolyacid compound may be deposited within the positive electrode active material layer by charge or preliminary charge. According to this, the compound derived from the heteropolyacid and/or the heteropolyacid compound may exist among positive electrode active material particles.

The compound derived from the heteropolyacid and/or the heteropolyacid compound includes a polyacid and/or a polyacid compound, or a reduced material of a polyacid and/or a polyacid compound, each of which is produced by electrolysis of the heteropolyacid and/or the heteropolyacid compound and which is poorer in solubility than the heteropolyacid and/or the polyacid compound, or the like.

A coating film containing a polyacid and/or a polyacid compound containing one or more kinds of a polyatom is formed on the surface of at least a part of a negative electrode 34. Specifically, the polyacid and/or the polyacid compound deposited on the surface of the negative electrode 34 is amorphous. For example, this amorphous polyacid and/or polyacid compound absorbs the nonaqueous electrolyte and exists as the coating film in a gel form of the negative electrode 34 on the negative electrode surface. For example, a deposit containing a polyacid and/or a polyacid compound, which is deposited on the negative electrode 34, grows in a three-dimensional network structure and deposits at the time of preliminary charge or charge. Also, a part of the deposited polyacid and/or polyacid compound may be reduced.

The presence or absence of the inorganic coating film derived from the heteropolyacid and/or the heteropolyacid compound can be confirmed by disassembling the nonaqueous electrolyte battery after charge or preliminary charge and taking out the positive electrode. For example, when a composition of the deposit deposited on the positive electrode collector is confirmed, and the polyacid and/or the polyacid compound is deposited, it can be easily supposed that the polyacid and/or the polyacid compound is similarly deposited on the positive electrode active material layer, and it can be confirmed that the inorganic coating film derived from the heteropolyacid and/or the heteropolyacid compound is formed.

The presence or absence of the polyacid and/or the polyacid compound can be, for example, confirmed by the X-ray photoelectron spectroscopy (XPS) analysis or time-of-flight secondary ion mass spectrometry (ToF-SIMS). In that case, the battery is disassembled, followed by washing with dimethyl carbonate. This is made for the purpose of removing a solvent component with low volatility and an electrolyte salt existing on the surface. It is desirable that sampling is carried out in an inert atmosphere if it is at all possible.

A content of the heteropolyacid and/or the heteropolyacid compound is preferably 0.01 parts by mass or more and not more than 5.0 parts by mass based on 100 parts by mass of the negative electrode active material. When the content of the heteropolyacid and/or the heteropolyacid compound is 0.01 parts by mass or more, an excellent device blister suppressing effect is obtainable, whereas when it is not more than 5.0 parts by mass, a lowering of the low-temperature characteristic can be suppressed. Here, the content of the heteropolyacid is defined to be a value obtained by subtracting the weight of bound water which the heteropolyacid has. Also, similarly, the weight of the heteropolyacid compound is defined to be a value obtained by subtracting the weight of bound water which the heteropolyacid compound has.

Figure 10:
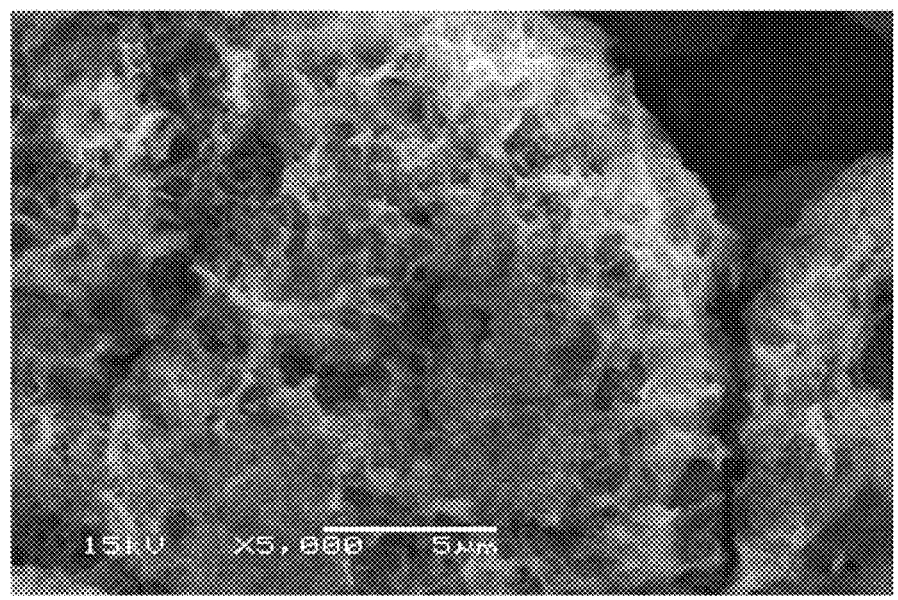
FIG. 10 is an SEM photograph showing a coating film in a gel form formed on a negative electrode surface.

The coating film in a gel form formed on the negative electrode surface according to the first embodiment, which contains the amorphous polyacid and/or polyacid compound composed of one or more kinds of a polyatom, can be, for example, confirmed by SEM (scanning electron microscope) as shown in FIG. 10. FIG. 10 is an SEM image of the negative electrode surface after charge and is a photograph taken after washing the electrolytic solution and then drying.

Also, the deposition of the amorphous polyacid and/or polyacid compound can be confirmed on the basis of structural analysis of the coating film formed on the negative electrode surface by the X-ray absorption fine structure (XAFS) analysis and chemical information of a molecule by the time-of-flight secondary ion mass spectrometry (ToF-SIMS).

Figure 11:
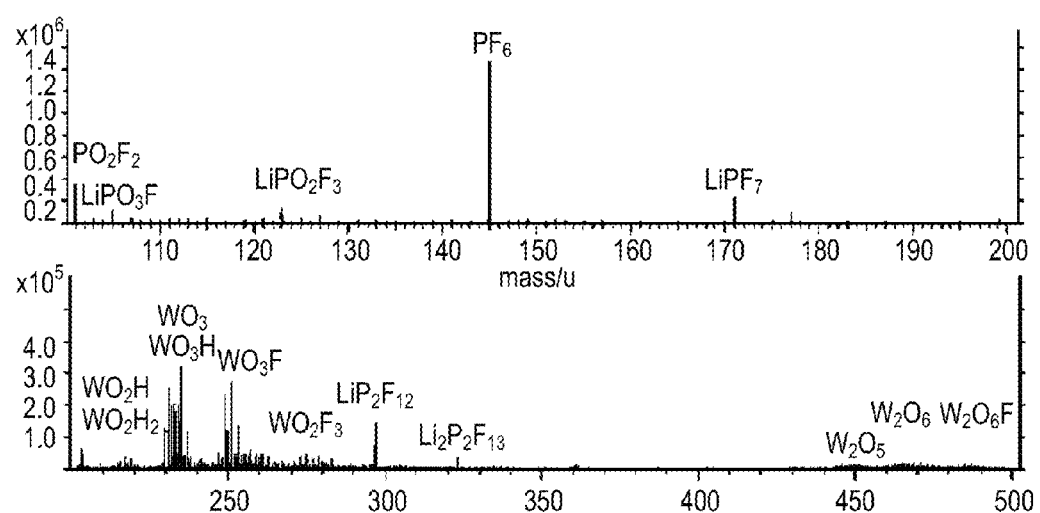
FIG. 11 is a diagram showing an example of a secondary ion spectrum by the time-of-flight secondary ion mass spectrometry on a negative electrode surface of a nonaqueous electrolyte battery having a negative electrode coating film formed thereon.

FIG. 11 shows an example of a secondary ion spectrum by the time-of-flight secondary ion mass spectrometry (ToF-SIMS) on the negative electrode surface of the nonaqueous electrolyte battery in which the negative electrode coating film according to the first embodiment is formed by adding silicotungstic acid into a battery system and charging the battery. It is noted from FIG. 11 that a molecule containing, as constituent elements, tungsten (W) and oxygen (O) is existent.

Figure 12:
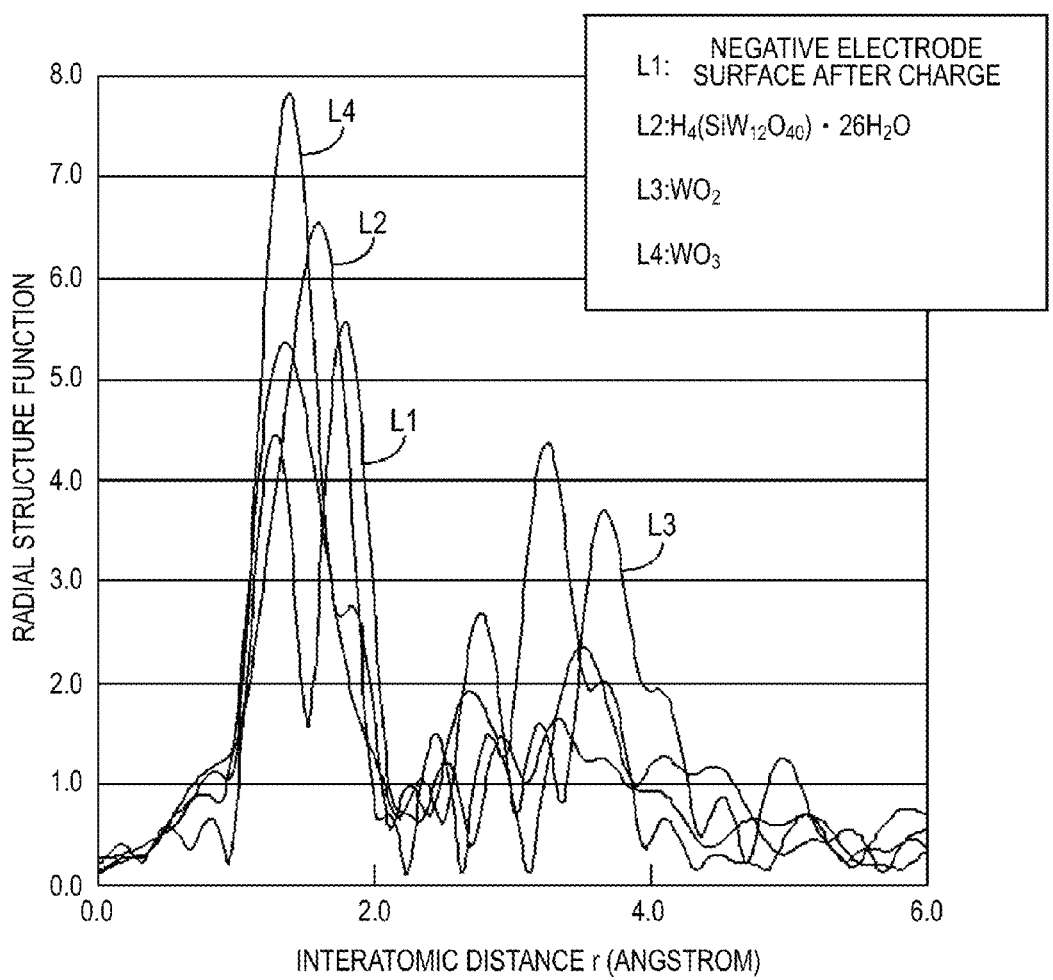
FIG. 12 is a diagram showing an example of a radial structure function of a W—O bond obtained by the Fourier transformation of a spectrum by the X-ray absorption fine structure analysis on a negative electrode surface of a nonaqueous electrolyte battery having a negative electrode coating film formed thereon.

Also, FIG. 12 shows an example of a radial structure function of a W—O bond obtained by the Fourier transformation of a spectrum by the X-ray absorption fine structure (XAFS) analysis on the negative electrode surface of the nonaqueous electrolyte battery in which the negative electrode coating film according to the first embodiment is formed by adding silicotungstic acid into a battery system and charging the battery. Also, FIG. 12 shows an example of a radial structure function of a W—O bond of each of tungstic acid ($WO_3$ or $WO_2$) as a polyacid which can be used in the first embodiment according to the present invention and silicotungstic acid ($H_4(SiW_{12}O_{40}) \cdot 26H_2O$) as a heteropolyacid which can be used in the first embodiment according to the present invention, along with the analysis results of the negative electrode coating film.

It is noted from FIG. 12 that a peak L1 of a deposit on the negative electrode surface has peaks at a different position from peaks L2, L3 and L4 of silicotungstic acid ($H_4(SiW_{12}O_{40}) \cdot 26H_2O$), tungsten dioxide ($WO_2$) and tungsten trioxide ($WO_3$), respectively and has a different structure. In tungsten trioxide ($WO_3$) and tungsten dioxide ($WO_2$), both of which are a typical tungsten oxide, and silicotungstic acid ($H_4(SiW_{12}O_{40}) \cdot 26H_2O$) which is a starting material of the first embodiment according to the present invention, in view of the radical structure function, main peaks are existent in the range of from 1.0 to 2.0 angstroms, and peaks can also be confirmed in the range of from 2.0 to 4.0 angstroms.

On the other hand, in the distribution of the W—O bond distance of the polyacid composed mainly of tungstic acid deposited on each of the positive electrode and the negative electrode in the first embodiment, though the peaks are confirmed within the range of from 1.0 to 2.0 angstroms, distinct peaks equivalent to those in the peak L1 are not found in the outside of the foregoing range. That is, no peak is substantially observed in the range exceeding 3.0 angstroms. In such a situation, it is confirmed that the deposit on the negative electrode surface is amorphous.

<2. Second Embodiment>

Next, an example of a nonaqueous electrolyte battery using the foregoing nonaqueous electrolyte composition is described.

[Configuration of Battery]

Figure 2:
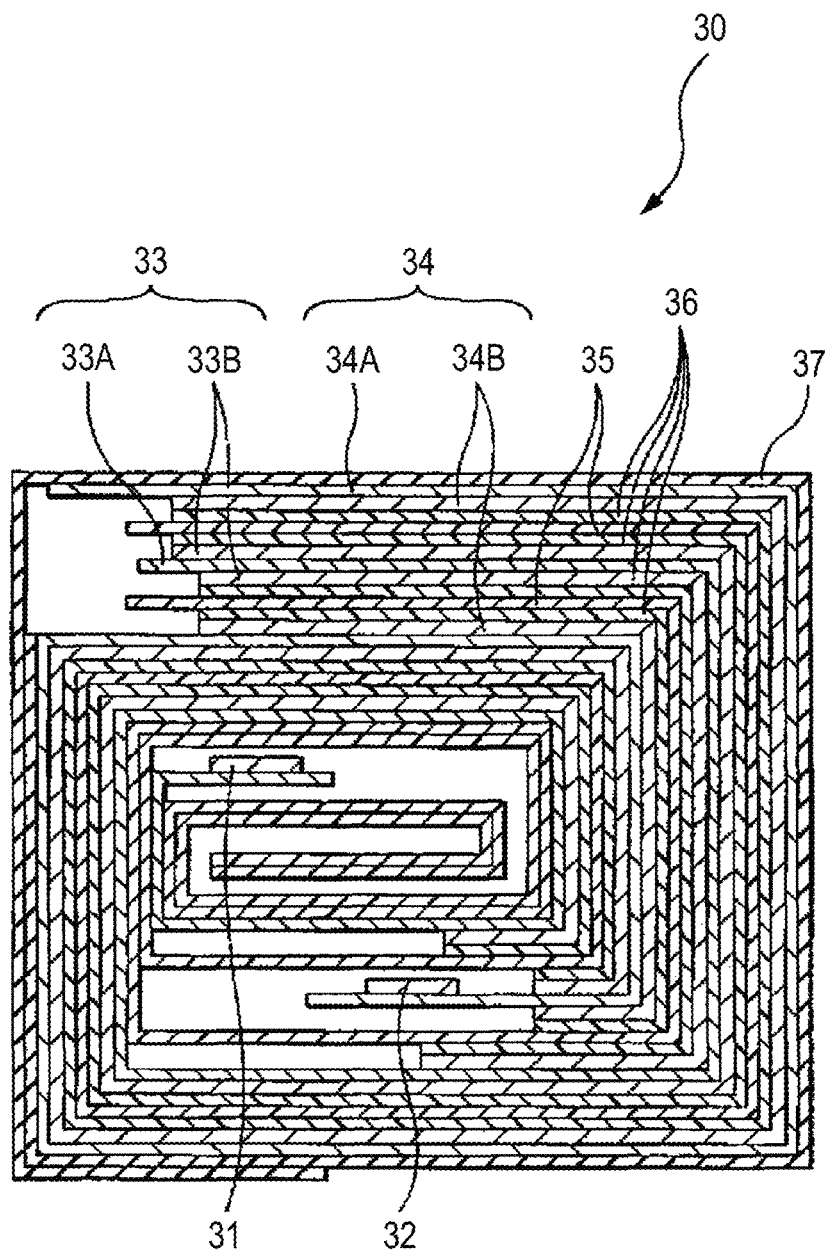
FIG. 2 is a sectional view along an I-I line of a wound electrode body shown in FIG. 1.

FIG. 1 shows an exploded perspective configuration of the nonaqueous electrolyte battery according the second embodiment; and FIG. 2 shows enlargedly of a section along an I-I line of a wound electrode body 30 shown in FIG. 1.

This nonaqueous electrolyte battery has a configuration in which the wound electrode body 30 having mainly a positive electrode lead 31 and a negative electrode lead 32 installed therein is housed in the inside of a film-shaped package member 40. A battery structure using this film-shaped package member 40 is called a laminated film type.

Each of the positive electrode lead 31 and the negative electrode lead 32 is, for example, led out from the inside of the package member 40 toward the outside in the same direction. The positive electrode lead 31 is, for example, constituted of a metal material such as aluminum, and the negative electrode lead 32 is, for example, constituted of a metal material such as copper, nickel and stainless steel. Such a metal material is, for example, formed in a thin plate state or a network state.

The package member 40 is, for example, constituted of an aluminum laminated film obtained by sticking a nylon film, an aluminum foil and a polyethylene film in this order. For example, this package member 40 has a structure in which respective outer edges of the two rectangular aluminum laminated films are allowed to adhere to each other by means of fusion or with an adhesive such that the polyethylene film is disposed opposing to the wound electrode body 30.

A contact film 41 is inserted between the package member 40 and each of the positive electrode lead 31 and the negative electrode lead 32 for the purpose of preventing invasion of the outside air from occurring. This contact film 41 is constituted of a material having adhesion to each of the positive electrode lead 31 and the negative electrode lead 32. Examples of such a material include polyolefin resins such as polyethylene, polypropylene, modified polyethylene and modified polypropylene.

The package member 40 may also be constituted of a laminated film having other lamination structure, or constituted of a polymer film such as polypropylene or a metal film, in place of the foregoing aluminum laminated film.

FIG. 2 shows a sectional configuration along an I-I line of the wound electrode body 30 shown in FIG. 1. This wound electrode body 30 is a wound electrode body prepared by laminating a positive electrode 33 and a negative electrode 34 via a separator 35 and an electrolyte 36 and winding the laminate, and an outermost peripheral part thereof is protected by a protective tape 37.

(Positive Electrode)

The positive electrode 33 is, for example, a positive electrode in which a positive electrode active material layer 33B is provided on the both surfaces of a positive electrode collector 33A having a pair of surfaces opposing to each other. However the positive electrode active material layer 33B may be provided on only one surface of the positive electrode collector 33A.

The positive electrode collector 33A is, for example, constituted of a metal material such as aluminum, nickel and stainless steel.

The positive electrode active material layer 33B contains, as a positive electrode active material, one or two or more kinds of a positive electrode material capable of intercalating and deintercalating lithium and may further contain other material such as a binder and a conductive agent, if desired.

(Positive Electrode Material)

As the positive electrode material capable of intercalating and deintercalating lithium, for example, lithium complex oxides such as lithium cobaltate, lithium nickelate and solid solutions thereof {for example, $Li(Ni_xCo_yMn_z)O_2$ (values of x, y and z are satisfied with relations of ($0<x<1$), ($0<y<1$), ($0 \leq z<1$) and ($x+y+z$)=1, respectively), $Li(Ni_xCo_yAl_z)O_2$ (values of x, y and z are satisfied with relations of ($0<x<1$), ($0<y<1$), ($0 \leq z<1$) and ($x+y+z$)=1, respectively), etc.}; manganese spinel ($LiMn_2O_4$) and solid solutions thereof {for example, $Li(Mn_{2-v}Ni_v)O_4$ (a value of v is satisfied with a relation of (v<2)), etc.}; and phosphate compounds having an olivine structure, such as lithium iron phosphate ($LiFePO_4$) and lithium manganese phosphate ($LiMPO_4$), are preferable. This is because a high energy density is obtainable. Specifically, $LiCoO_2$, $LiNiO_2$, $LiMn_2O_4$, $LiFePO_4$ and the like are exemplified. The transition metal element can be used singly, or two or more kinds thereof can also be used. Examples thereof include $LiNi_{0.5}Co_{0.5}O_2$, $LiNi_{0.5}Co_{0.3}Mn_{0.2}O_2$ and $LiFe_{0.5}Mn_{0.5}PO_4$. Such a material can also be used in admixture of two or more kinds thereof.

Above all, from the standpoint of a high capacity, a lithium nickel complex oxide with a high content of nickel, which is represented by $LiNi_xM_{1-x}O_2$ (wherein M represents at least one element selected from the Groups 2 to 15 (provided that Ni is excluded); and x is a satisfied with a relation of ($0.5 \leq x \leq 1.0$), is preferable as the positive electrode material capable of intercalating and deintercalating lithium.

A positive electrode material obtained by subjecting lithium cobaltate, lithium nickelate or a solid solution thereof to a coating treatment may be used as the positive electrode active material. That is, for example, a positive electrode material obtained by coating at least a part of a particle surface of lithium cobaltate, lithium nickelate or a solid solution thereof with a phosphate compound such as lithium phosphate ($Li_3PO_4$) and lithium iron phosphate ($LiFePO_4$) may be used as the positive electrode active material. When this positive electrode material is used, the blister at the time of high-temperature storage can be more suppressed. This is because when this positive electrode material is used, lithium phosphate suppresses the contact between the electrolytic solution and the lithium nickel complex oxide, thereby conducting only a lithium ion. The coating treatment is, for example, carried out by mixing the phosphate compound with lithium cobaltate, lithium nickelate or a solid solution thereof by a ball milling apparatus.

Also, examples of the positive electrode material capable of intercalating and deintercalating lithium include oxides such as titanium oxide, vanadium oxide and manganese dioxide; disulfides such as iron disulfide, titanium disulfide and molybdenum sulfide; sulfur; and conductive polymers such as polyaniline and polythiophene.

As a matter of course, the positive electrode material capable of intercalating and deintercalating lithium may be other materials than those exemplified above.

Examples of the binder include synthetic rubbers such as a styrene butadiene based rubber, a fluorocarbon based rubber and an ethylene propylene diene based rubber; and polymer materials such as polyvinylidene fluoride. These materials may be used singly or in admixture of plural kinds thereof.

Examples of the conductive agent include carbon materials such as graphite and carbon black. These materials are used singly or in admixture of plural kinds thereof.

(Negative Electrode)

The negative electrode 34 is, for example, one in which a negative electrode active material layer 34B is provided on the both surfaces of a negative electrode collector 34A having a pair of surfaces opposing to each other. However, the negative electrode active material layer 34B may be provided on only one surface of the negative electrode collector 34A.

The negative electrode collector 34A is, for example, constituted of a metal material such as copper, nickel and stainless steel.

The negative electrode active material layer 34B contains, as a negative electrode active material, one or two or more kinds of a negative electrode material capable of intercalating and deintercalating lithium and may contain other materials such as a binder and a conductive agent, if desired.

Examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, an excellent cycle characteristic is obtainable, and the carbon material also functions as a conductive agent. The shape of the carbon material may be any of a fibrous shape, a spherical shape, a granular shape or a flaky shape.

In addition to the foregoing carbon materials, examples of the negative electrode material capable of intercalating and deintercalating lithium include a material capable of intercalating and deintercalating lithium and containing, as a constituent element, at least one member selected from the group consisting of metal elements and semi-metal elements. This is because a high energy density is obtainable. Such a negative electrode material may be a simple substance, an alloy or a compound of a metal element or a semi-metal element. Also, one having one or two or more kinds of a phase in at least a part thereof may be used. The "alloy" as referred to herein includes, in addition to alloys composed of two or more kinds of a metal element, alloys containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Of these, at least one member selected from silicon and tin is preferable, and silicon is more preferable. This is because silicon and tin have large capability to intercalate and deintercalate lithium, so that a high energy density is obtainable.

Examples of the negative electrode material containing at least one member selected from silicon and tin include a simple substance, an alloy or a compound of silicon; a simple substance, an alloy or a compound of tin; and one having one kind or two or more kinds of a phase in at least a part thereof.

Examples of alloys of silicon include alloys containing, as a second constituent element other than silicon, at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of silicon or compounds of tin include compounds containing oxygen (O) or carbon (C), and these compounds may further contain the foregoing second constituent element in addition to silicon (Si) or tin (Sn).

As the negative electrode material containing at least one member selected from silicon (Si) and tin (Sn), for example, a material containing tin (Sn) as a first constituent element and in addition to this tin (Sn), a second constituent element and a third constituent element is especially preferable. As a matter of course, this negative electrode material may be used together with the foregoing negative electrode material. The second constituent element is at least one member selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one member selected from the group consisting of boron (B), carbon (C), aluminum (Al) and phosphorus (P). This is because when the second constituent element and the third constituent element are contained, a cycle characteristic is enhanced.

Above of all, the negative electrode material is preferably an SnCoC-containing material containing tin (Sn), cobalt (Co) and carbon (C) as constituent elements and having a content of carbon (C) in the range of 9.9% by mass or more and not more than 29.7% by mass and a proportion of cobalt (Co) to the total sum of tin (Sn) and cobalt (Co) (Co/(Sn+Co)) in the range of 30% by mass or more and not more than 70% by mass. This is because in the foregoing composition range, not only a high energy density is obtainable, but an excellent cycle characteristic is obtainable.

This SnCoC-containing material may further contain other constituent elements, if desired. As other constituent elements, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi) are preferable. The SnCoC-containing material may contain two or more kinds of these elements. This is because a capacity characteristic or a cycle characteristic is more enhanced.

The SnCoC-containing material has a phase containing tin (Sn), cobalt (Co) and carbon (C), and this phase is preferably a lowly crystalline or amorphous phase. Also, in the SnCoC-containing material, it is preferable that at least a part of carbon as the constituent element is bound to a metal element or a semi-metal element as other constituent element. This is because though it may be considered that a lowering of the cycle characteristic is caused due to aggregation or crystallization of tin (Sn) or the like, when carbon is bound to other element, such aggregation or crystallization is suppressed.

Examples of a measurement method for examining the binding state of elements include X-ray photoelectron spectroscopy (XPS). In this XPS, so far as graphite is concerned, a peak of the 1s orbit (C1s) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the 1s orbit (C1s) of carbon appears at 284.8 eV. On the contrary, in the case where a charge density of the carbon element is high, for example, in the case where carbon is bound to a metal element or a semi-metal element, the peak of C1s appears in a lower region than 284.5 eV. That is, in the case where a peak of a combined wave of C1s obtained regarding the SnCoC-containing material appears in a lower region than 284.5 eV, at least a part of carbon (C) contained in the SnCoC-containing material is bound to a metal element or a semi-metal element as other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the side of a lowest binding energy is used as an energy reference (284.8 eV).

Also, examples of the negative electrode material capable of intercalating and deintercalating lithium include metal oxides and polymer compounds, each of which is capable of intercalating and deintercalating lithium. Examples of the metal oxide include iron oxide, ruthenium oxide and molybdenum oxide; and examples of the polymer compound include polyacetylene, polyaniline and polypyrrole.

Furthermore, the negative electrode material capable of intercalating and deintercalating lithium may be a material containing an element capable of forming a complex oxide with lithium, such as titanium.

As a matter of course, metallic lithium may be used as the negative electrode active material, thereby depositing and dissolving the metallic lithium. It is also possible to deposit and dissolve magnesium or aluminum other than lithium.

The negative electrode active material layer 34B may be, for example, formed by any of a vapor phase method, a liquid phase method, a spraying method, a baking method or a coating method, or a combined method of two or more kinds of these methods. Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and non-electrolytic plating can be adopted. The baking method as referred to herein is, for example, a method in which after a granular negative electrode active material is mixed with a binder and the like, the mixture is dispersed in a solvent and coated, and the coated material is then heat treated at a higher temperature than a melting point of the binder, etc. As to the baking method, known techniques can be utilized, too, and examples thereof include an atmospheric baking method, a reaction baking method and a hot press baking method.

In the case of using metallic lithium as the negative electrode active material, the negative electrode active material layer 34B may be previously provided at the time of assembling. However, it may be absent at the time of assembling but may be constituted of a lithium metal deposited at the time of charge. Also, the negative electrode collector 34A may be omitted by utilizing the negative electrode active material layer 34B as a collector, too.

(Separator)

The separator 35 partitions the positive electrode 33 and the negative electrode 34 from each other and allows a lithium ion to pass therethrough while preventing a short circuit of the current to be caused due to the contact between the both electrodes. This separator 35 is constituted of, for example, a porous film made of a synthetic resin such as polytetrafluoroethylene, polypropylene and polyethylene; a porous film made of a ceramic; or the like, and a laminate of two or more kinds of these porous films may also be used.

(Electrolyte)

The electrolyte is the nonaqueous electrolyte composition according the first embodiment.

[Manufacturing Method of Battery]

Next, a manufacturing method of the nonaqueous electrolyte battery having the foregoing configuration is described.

(Manufacture of Positive Electrode)

First of all, the positive electrode 33 is fabricated. For example, a positive electrode material, a binder and a conductive agent are mixed to form a positive electrode mixture, which is then dispersed in an organic solvent to form a positive electrode mixture slurry in a paste form. Subsequently, the positive electrode mixture slurry is uniformly coated on the both surfaces of the positive electrode collector 33A by a doctor blade or a bar coater or the like and then dried. Finally, the resultant is subjected to compression molding by a roll press or the like while heating, if desired, thereby forming the positive electrode active material layer 33B. In that case, the compression molding may be repeatedly carried out plural times.

(Manufacture of Negative Electrode)

Next, the negative electrode 34 is fabricated. For example, a negative electrode material and a binder and optionally, a conductive agent are mixed to form a negative electrode mixture, which is then dispersed in an organic solvent to form a negative electrode mixture slurry in a paste form. Subsequently, the negative electrode mixture slurry is uniformly coated on the both surfaces of the negative electrode collector 34A by a doctor blade or a bar coater or the like and then dried. Finally, the resultant is subjected to compression molding by a roll press or the like while heating, if desired, thereby forming the negative electrode active material layer 34B.

Subsequently, a precursor solution containing an electrolytic solution, a polymer compound, a solvent and a ceramic powder is prepared and coated on each of the positive electrode 33 and the negative electrode 34, and the solvent is then vaporized to form the electrolyte 36 in a gel form. The heteropolyacid and/or the heteropolyacid compound is added on the occasion of preparing the electrolytic solution. Subsequently, the positive electrode lead 31 is installed in the positive electrode collector 33A, and the negative electrode lead 32 is also installed in the negative electrode collector 34A.

Subsequently, the positive electrode 33 and the negative electrode 34 each having the electrolyte 36 formed thereon are laminated via the separator 35, the laminate is then wound in a longitudinal direction thereof, and the protective tape 37 is allowed to adhere to an outermost peripheral part thereof, thereby fabricating the wound electrode body 30. Finally, for example, the wound electrode body 30 is interposed between the two package members 40 in a film form, and the outer edges of the package members 40 are allowed to adhere to each other by means of heat fusion, etc., thereby sealing the wound electrode body 30 therein. On that occasion, the contact film 41 is inserted between each of the positive electrode lead 31 and the negative electrode lead 32 and the package member 40. There is thus completed the nonaqueous electrolyte battery shown in FIGS. 3 and 4.

This nonaqueous electrolyte battery is, for example, a nonaqueous electrolyte secondary battery capable of undergoing charge and discharge. For example, when charged, a lithium ion is deintercalated from the positive electrode 33 and intercalated in the negative electrode 34 via the electrolyte 36. When discharged, the lithium ion is deintercalated from the negative electrode 34 and intercalated in the positive electrode 33 via the electrolyte 36. Alternatively, for example, when charged, the lithium ion in the electrolyte 36 receives an electron and is deposited as metallic lithium on the negative electrode 34. When discharged, the metallic lithium of the negative electrode 34 deintercalates an electron and is dissolved as a lithium ion in the electrolyte 36. Alternatively, for example, when charged, the lithium ion is deintercalated from the positive electrode 33 and intercalated in the electrode 34 via the electrolyte 36, and the metallic lithium is deposited on the way of charge. When discharged, the deposited metallic lithium deintercalates an electron and is dissolved as a lithium ion in the negative electrode 34; the lithium ion intercalated in the negative electrode 34 is deintercalated on the way of discharge; and these lithium ions are intercalated in the positive electrode 33 via the electrolyte 36.

MODIFICATION EXAMPLES

While in the foregoing configuration example of the nonaqueous electrolyte battery, an example in which the heteropolyacid and/or the heteropolyacid compound is previously added to the electrolytic solution has been described, the heteropolyacid and/or the heteropolyacid compound may be added to other battery constituent element than the electrolytic solution.

In the following first to third modification examples, configuration examples of a nonaqueous electrolyte battery in which the heteropolyacid and/or the heteropolyacid compound is previously added to other battery constituent element than the electrolytic solution are described. In the following, descriptions are made centering on points which are different from those of the foregoing configuration examples of a nonaqueous electrolyte battery (an example in which the heteropolyacid and/or the heteropolyacid compound is previously added to the electrolytic solution), and descriptions on the same points as in the foregoing configuration examples of a nonaqueous electrolyte battery are properly omitted.

First Modification Example

Example of Adding a Heteropolyacid and/or a Heteropolyacid Compound to a Positive Electrode Active Material Layer A first modification example is the same as the foregoing configuration example of a nonaqueous electrolyte battery, except that the heteropolyacid and/or the heteropolyacid compound is not previously added to the electrolytic solution but added to the positive electrode active material layer 33B.

(Manufacturing Method of Positive Electrode 33)

In the first modification example, the positive electrode 33 is fabricated in the following manner. First of all, a positive electrode material, a binder and a conductive agent are mixed. Also, a heteropolyacid and/or a heteropolyacid compound is dissolved in an organic solvent such as N-methyl-2-pyrrolidone to prepare a solution. Subsequently, this solution is mixed with the foregoing mixture of a positive electrode material, a binder and a conductive agent to prepare a positive electrode mixture, and this positive electrode mixture is then dispersed in an organic solvent such as N-methyl-2-pyrrolidone to form a positive electrode mixture slurry. Subsequently, the positive electrode mixture slurry is uniformly coated on the both surfaces of the positive electrode collector 33A by a doctor blade or a bar coater or the like and then dried. Finally, the resultant is subjected to compression molding by a roll press or the like while heating, if desired, thereby forming the positive electrode active material layer 33B.

(Positive Electrode Active Material Layer 33B)

In the first modification example, the positive electrode active material layer 33B contains, as a positive electrode active material, one or two or more kinds of a positive electrode material capable of intercalating and deintercalating lithium and a heteropolyacid and/or a heteropolyacid compound before charge/discharge. The positive electrode active material layer 33B may contain other material such as a binder and a conductive agent, if desired.

(Behavior of Heteropolyacid and/or Heteropolyacid Compound by Charge)

The electrolytic solution is impregnated in the positive electrode active material layer 33B. According to this, the heteropolyacid and/or the heteropolyacid compound contained in the positive electrode active material layer 33B elutes into the electrolytic solution. Then, a coating film derived from the heteropolyacid and/or the heteropolyacid compound having eluted into the electrolytic solution is formed on the negative electrode 34 by initial charge or preliminary charge.

That is, the heteropolyacid and/or the heteropolyacid compound having eluted into the electrolytic solution is electrolyzed by initial charge or preliminary charge, whereby a compound derived from the heteropolyacid and/or the heteropolyacid compound is deposited on the surface of the negative electrode 34 to form an inorganic coating film.

Also, the heteropolyacid and/or the heteropolyacid compound having eluted into the electrolytic solution is electrolyzed by initial charge or preliminary charge, whereby a compound derived from the heteropolyacid and/or the heteropolyacid compound is deposited on the surface of the positive electrode 33 to form an inorganic coating film.

Also, in view of the fact that the electrolytic solution having the heteropolyacid and/or the heteropolyacid compound eluted thereinto is impregnated in the negative electrode active material layer 34B, a compound derived from the heteropolyacid and/or the heteropolyacid compound may be deposited within the negative electrode active material layer 34B by charge or preliminary charge. According to this, a compound derived from the heteropolyacid and/or the heteropolyacid compound may exist among negative electrode active material particles.

Also, in view of the fact that the electrolytic solution having the heteropolyacid and/or the heteropolyacid compound eluted thereinto is impregnated in the positive electrode active material layer 33B, a compound derived from the heteropolyacid and/or the heteropolyacid compound may be deposited within the positive electrode active material layer 33B by charge or preliminary charge. According to this, a compound derived from the heteropolyacid and/or the heteropolyacid compound may exist among positive electrode active material particles.

Second Modification Example

Example of Adding a Heteropolyacid and/or a Heteropolyacid Compound to a Negative Electrode Active Material Layer A second modification example is the same as the foregoing configuration example of a nonaqueous electrolyte battery, except that the heteropolyacid and/or the heteropolyacid compound is not previously added to the electrolytic solution but added to the negative electrode active material layer 34B.

(Manufacturing Method of Negative Electrode 34)

In the second modification example, the negative electrode 34 is fabricated in the following manner. First of all, a negative electrode material, a binder and optionally, a conductive agent are mixed. Also, a heteropolyacid and/or a heteropolyacid compound is dissolved to prepare a solution. Subsequently, this solution is mixed with the foregoing mixture to prepare a negative electrode mixture, which is then dispersed in an organic solvent such as N-methyl-2-pyrrolidone to form a negative electrode mixture slurry in a paste form. Subsequently, the negative electrode mixture slurry is uniformly coated on the both surfaces of the negative electrode collector 34A by a doctor blade or a bar coater or the like and then dried. Finally, the resultant is subjected to compression molding by a roll press or the like while heating, if desired, thereby forming the negative electrode active material layer 34B.

(Negative Electrode Active Material Layer 34B)

In the second modification example, the negative electrode active material layer 34B contains, as a negative electrode active material, one or two or more kinds of a negative electrode material capable of intercalating and deintercalating lithium and a heteropolyacid and/or a heteropolyacid compound before charge/discharge. The negative electrode active material layer 34B may contain other material such as a binder and a conductive agent, if desired.

(Behavior of Heteropolyacid and/or Heteropolyacid Compound by Charge)

The electrolytic solution is impregnated in the negative electrode active material layer 34B. According to this, the heteropolyacid and/or the heteropolyacid compound contained in the negative electrode active material layer 34B elutes into the electrolytic solution. Then, a coating film derived from the heteropolyacid and/or the heteropolyacid compound having eluted into the electrolytic solution is formed on the negative electrode 34 by initial charge or preliminary charge.

That is, the heteropolyacid and/or the heteropolyacid compound having eluted into the electrolytic solution is electrolyzed by initial charge or preliminary charge, whereby a compound derived from the heteropolyacid and/or the heteropolyacid compound is deposited on the surface of the negative electrode 34 to form an inorganic coating film.

Also, the heteropolyacid and/or the heteropolyacid compound having eluted into the electrolytic solution is electrolyzed by initial charge or preliminary charge depending upon the addition amount of the heteropolyacid and/or the heteropolyacid compound, whereby a compound derived from the heteropolyacid and/or the heteropolyacid compound is deposited on the surface of the positive electrode 33 to form an inorganic coating film.

Also, in view of the fact that the electrolytic solution having the heteropolyacid and/or the heteropolyacid compound eluted thereinto is impregnated in the negative electrode active material layer 34B, a compound derived from the heteropolyacid and/or the heteropolyacid compound may be deposited within the negative electrode active material layer 34B by charge or preliminary charge. According to this, a compound derived from the heteropolyacid and/or the heteropolyacid compound may exist among negative electrode active material particles.

Also, in view of the fact that the electrolytic solution having the heteropolyacid and/or the heteropolyacid compound eluted thereinto is impregnated in the positive electrode active material layer 33B, a compound derived from the heteropolyacid and/or the heteropolyacid compound may be deposited within the positive electrode active material layer 33B by charge or preliminary charge. According to this, a compound derived from the heteropolyacid and/or the heteropolyacid compound may exist among positive electrode active material particles.

Third Modification Example

A third modification example is the same as the foregoing configuration example of a nonaqueous electrolyte battery, except that the heteropolyacid and/or the heteropolyacid compound is not previously added to the electrolytic solution, but the heteropolyacid and/or the heteropolyacid compound is previously added to the separator 35.

In the third modification example, the heteropolyacid and/or the heteropolyacid compound is previously added to the separator 35. For example, the heteropolyacid and/or the heteropolyacid compound is previously added to the separator 35 in the following manner.

The separator 35 is dipped in and impregnated with a solution obtained by dissolving the heteropolyacid and/or the heteropolyacid compound in a polar organic solvent such as dimethyl carbonate, followed by drying in a vacuum atmosphere. According to this, the heteropolyacid and/or the heteropolyacid compound is deposited on the surface or within pores of the separator 35.

(Behavior of Heteropolyacid and/or Heteropolyacid Compound by Charge)

The electrolytic solution is impregnated in the separator 35. According to this, the heteropolyacid and/or the heteropolyacid compound added to the separator 35 elutes into the electrolytic solution. Then, a coating film derived from the heteropolyacid and/or the heteropolyacid compound having eluted into the electrolytic solution is formed on the negative electrode 34 by initial charge or preliminary charge.

That is, the heteropolyacid and/or the heteropolyacid compound having eluted into the electrolytic solution is electrolyzed by initial charge or preliminary charge, whereby a compound derived from the heteropolyacid and/or the heteropolyacid compound is deposited on the surface of the negative electrode 34 to form an inorganic coating film.

Also, the heteropolyacid and/or the heteropolyacid compound having eluted into the electrolytic solution is electrolyzed by initial charge or preliminary charge depending upon the addition amount of the heteropolyacid and/or the heteropolyacid compound, whereby a compound derived from the heteropolyacid and/or the heteropolyacid compound is deposited on the surface of the positive electrode 33 to form an inorganic coating film.

Also, in view of the fact that the electrolytic solution having the heteropolyacid and/or the heteropolyacid compound eluted thereinto is impregnated in the negative electrode active material layer 34B, a compound derived from the heteropolyacid and/or the heteropolyacid compound may be deposited within the negative electrode active material layer 34B by charge or preliminary charge. According to this, a compound derived from the heteropolyacid and/or the heteropolyacid compound may exist among negative electrode active material particles.

Also, in view of the fact that the electrolytic solution having the heteropolyacid and/or the heteropolyacid compound eluted thereinto is impregnated in the positive electrode active material layer 33B, a compound derived from the heteropolyacid and/or the heteropolyacid compound may be deposited within the positive electrode active material layer 33B by charge or preliminary charge. According to this, a compound derived from the heteropolyacid and/or the heteropolyacid compound may exist among positive electrode active material particles.

According to the second embodiment, since not only the heteropolyacid and/or the heteropolyacid compound is contained in the battery, but the ceramic powder is added to the electrolyte, deterioration in a high-temperature cycle characteristic and device blister of the battery to be caused due to the cycle can be suppressed.

<3. Third Embodiment>

Configuration of Nonaqueous Electrolyte Battery

Figure 3:
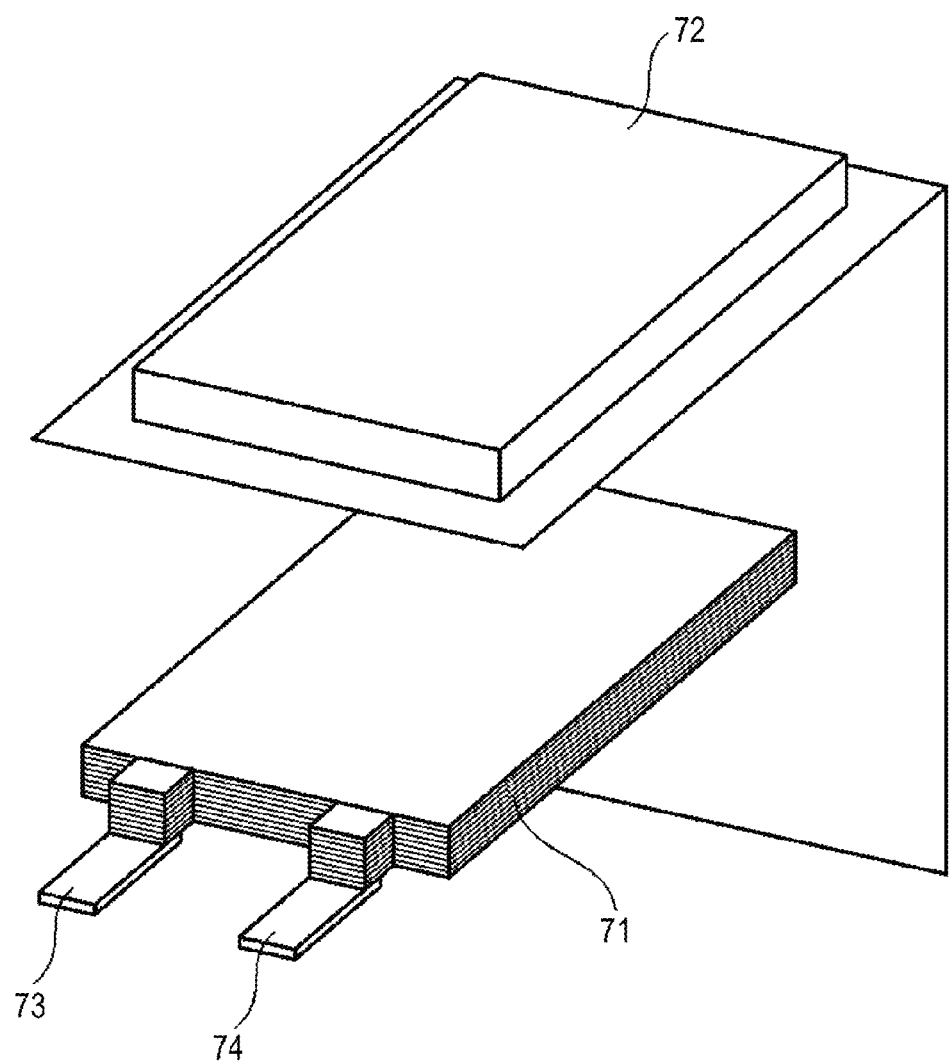
FIG. 3 is an exploded perspective view showing an example of a configuration of a nonaqueous electrolyte battery according a third embodiment.

FIG. 3 is an exploded perspective view showing an example of a configuration of a nonaqueous electrolyte battery according to a third embodiment. As shown in FIG. 3, this nonaqueous electrolyte battery is one in which a battery device 71 having a positive electrode lead 73 and a negative electrode lead 74 installed therein is housed in the inside of a package member 72 in a film form and is able to realize downsizing, weight reduction and thinning Each of the positive electrode lead 73 and the negative electrode lead 74 is, for example, led out from the inside of the package member 72 toward the outside in the same direction.

Figure 4:
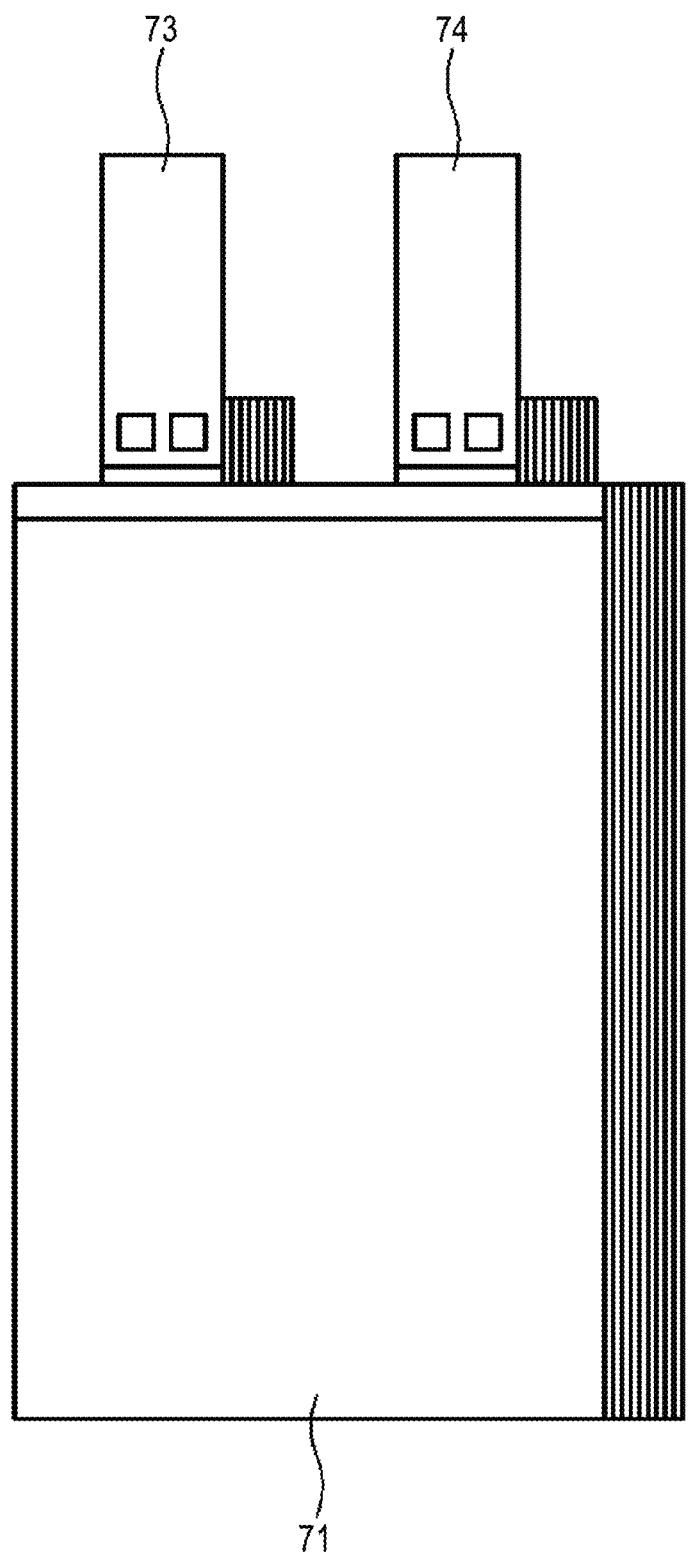
FIG. 4 is a perspective view showing an example of an appearance of a battery device shown in FIG. 3.
Figure 5:
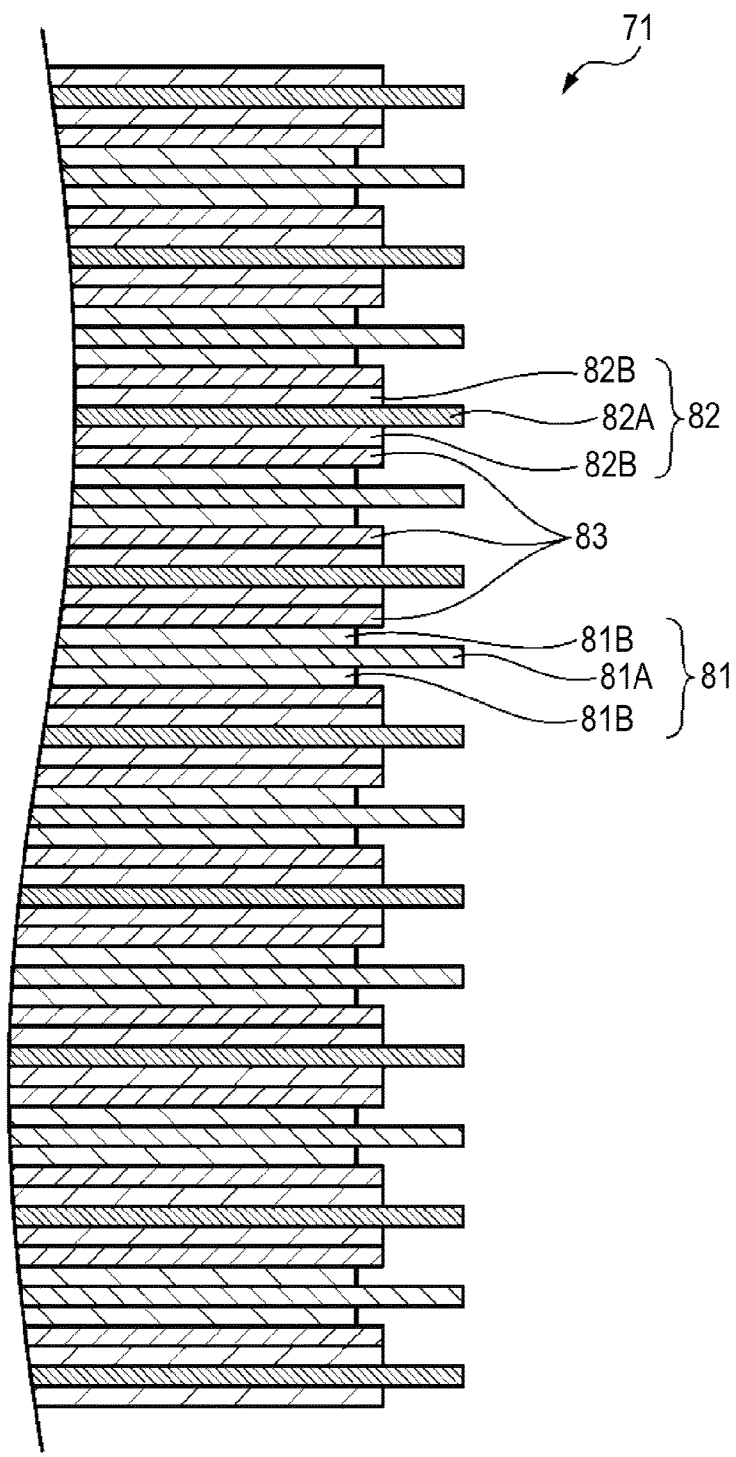
FIG. 5 is a sectional view showing an example of a configuration of a battery device shown in FIG. 3.

FIG. 4 is a perspective view showing an example of an appearance of the battery device 71. FIG. 5 is a sectional view showing an example of a configuration of the battery device 71. As shown in FIGS. 4 and 5, this battery device 71 is a laminated electrode body in which a positive electrode 81 and a negative electrode 82 are laminated via a separator 83, and the battery device 71 is impregnated with the electrolytic solution according to the first embodiment.

Figure 6:
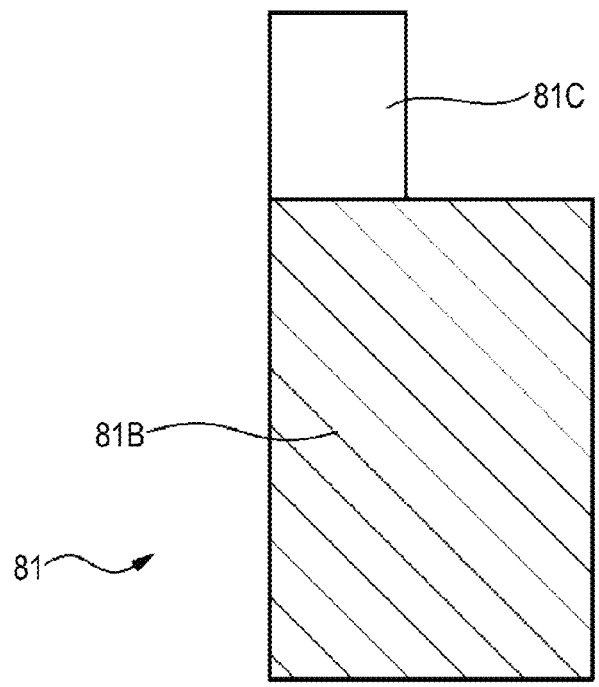
FIG. 6 is a plan view showing an example of a configuration of a positive electrode.

For example, the positive electrode 81 has a structure in which a positive electrode active material layer 81B is provided on the both surfaces of a positive electrode collector 81A having a pair of surfaces. As shown in FIG. 6, the positive electrode 81 has a rectangular electrode portion and a collector-exposed portion 81C extending from one side of the electrode portion. This collector-exposed portion 81C is not provided with the positive electrode active material layer 81B and is in a state where the positive electrode collector 81A is exposed. The collector-exposed portion 81C is electrically connected to the positive electrode lead 73. While illustration is omitted, a region where the positive electrode active material layer 81B is existent only on one surface of the positive electrode collector 81A may be provided.

Figure 7:
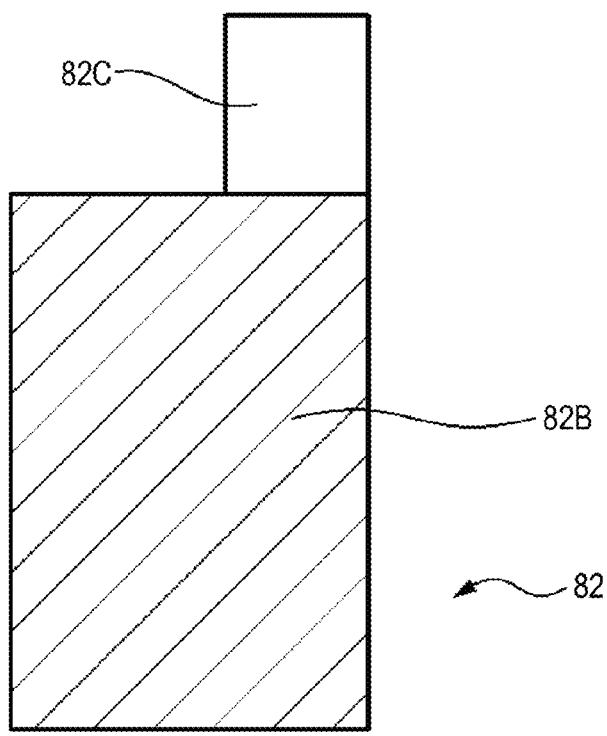
FIG. 7 is a plan view showing an example of a configuration of a negative electrode.

For example, the negative electrode 82 has a structure in which a negative electrode active material layer 82B is provided on the both surfaces of a negative electrode collector 82A having a pair of surfaces. As shown in FIG. 7, the negative electrode 82 has a rectangular electrode portion and a collector-exposed portion 82C extending from one side of the electrode portion. This collector-exposed portion 82C is not provided with the negative electrode active material layer 82B and is in a state where the negative electrode collector 82A is exposed. The collector-exposed portion 82C is electrically connected to the negative electrode lead 74. While illustration is omitted, a region where the negative electrode active material layer 82B is existent only on one surface of the negative electrode collector 82A may be provided.

Figure 8:
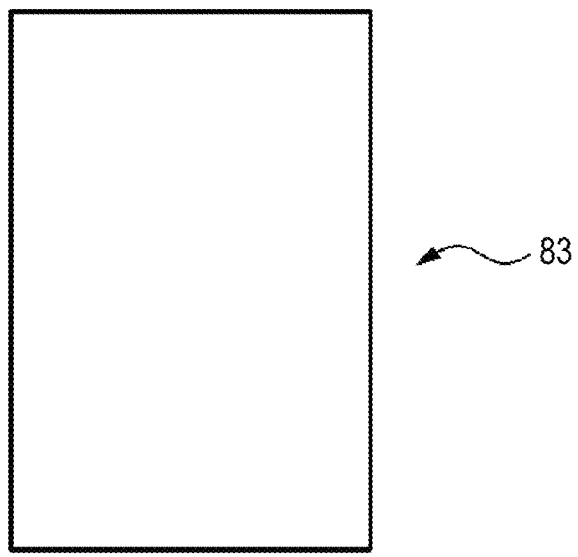
FIG. 8 is a plan view showing an example of a configuration of a separator.

As shown in FIG. 8, the separator 83 has a shape such as a rectangular shape.

Materials constituting the positive electrode collector 81A, the positive electrode active material layer 81B, the negative electrode collector 82A, the negative electrode active material layer 82B and the separator 83 are the same as those in the positive electrode collector 33A, the positive electrode active material layer 33B, the negative electrode collector 34A, the negative electrode active material layer 34B and the separator 35 in the second embodiment according, respectively.

(Manufacturing Method of Nonaqueous Electrolyte Battery)

The thus configured nonaqueous electrolyte battery can be, for example, manufactured in the following manner.

(Fabrication of Positive Electrode)

The positive electrode 81 is fabricated in the following manner. First of all, for example, a positive electrode active material, a binder and a conductive agent are mixed to prepare a positive electrode mixture, and this positive electrode mixture is dispersed in an organic solvent such as N-methylpyrrolidone to prepare a positive electrode mixture slurry in a paste form. Subsequently, the positive electrode mixture slurry is coated on the both surfaces of the positive electrode collector 81A and dried, followed by pressing to form the positive electrode active material layer 81B. Thereafter, the resultant is cut into the shape shown in FIG. 6, or the like, thereby obtaining the positive electrode 81.

(Fabrication of Negative Electrode)

The negative electrode 82 is fabricated in the following manner. First of all, for example, a negative electrode active material, a binder and a conductive agent are mixed to prepare a negative electrode mixture, and this negative electrode mixture is dispersed in an organic solvent such as N-methylpyrrolidone to prepare a negative electrode mixture slurry in a paste form. Subsequently, the negative electrode mixture slurry is coated on the both surfaces of the negative electrode collector 82A and dried, followed by pressing to form the negative electrode active material layer 82B. Thereafter, the resultant is cut into the shape shown in FIG. 7, or the like, thereby obtaining the negative electrode 82.

(Fabrication of Battery Device)

The battery device 71 is fabricated in the following manner. First of all, a polypropylene-made microporous film or the like is cut into the shape shown in FIG. 8, thereby fabricating the separator 83. Subsequently, a plural number of the thus obtained negative electrodes 82, positive electrodes 81 and separators 83 are, for example, laminated in the order of the negative electrode 82, the separator 83, the positive electrode 81, . . . , the positive electrode 81, the separator 83 and the negative electrode 82, as shown in FIG. 5, thereby fabricating the battery device 71.

Subsequently, the collector-exposed portion 81C of the positive electrode 81 is welded to the positive electrode lead 73. Similarly, the collector-exposed portion 82C of the negative electrode 82 is welded to the negative electrode lead 74. Subsequently, after impregnating the electrolytic solution in the battery device 71, the battery device 71 is interposed between the package members 72, and the outer edges of the package members 72 are allowed to adhere to each other by means of heat fusion or the like, thereby sealing the battery device 71 therein. On that occasion, each of the positive electrode lead 73 and the negative electrode lead 74 is disposed so as to come out from the package member 72 via the heat-fused part, thereby forming positive and negative electrode terminals. There is thus obtained the desired nonaqueous electrolyte battery.

<Effect>

The third embodiment has the same effects as those in the second embodiment.

<4. Fourth Embodiment>

Next, a fourth embodiment is described. A nonaqueous electrolyte battery according to this fourth embodiment is one using an electrolyte layer in a gel form in place of the electrolytic solution in the nonaqueous electrolyte battery according to the third embodiment. The same portions as those in the third embodiment are given the same symbols, and their descriptions are omitted.

(Configuration of Nonaqueous Electrolyte Battery)

Figure 9:
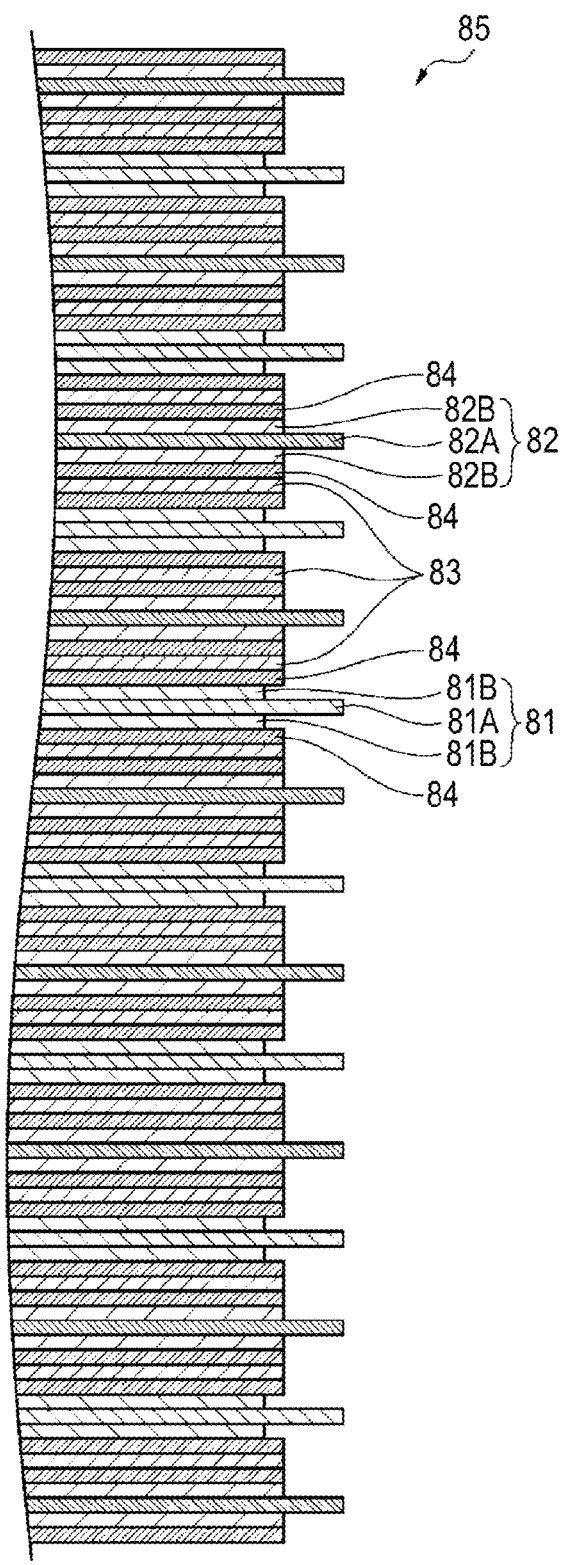
FIG. 9 is a sectional view showing an example of a configuration of a battery device to be used for a nonaqueous electrode secondary battery according to a fourth embodiment.

FIG. 9 is a sectional view showing an example of a configuration of a battery device to be used for the nonaqueous electrode secondary battery according to the fourth embodiment. A battery device 85 is one in which the positive electrode 81 and the negative electrode 82 are laminated via the separator 83 and an electrolyte layer 84.

The electrolyte layer 84 contains the electrolytic solution according to the first embodiment and a polymer compound serving as a holding material capable of holding this electrolytic solution therein and is prepared in a so-called gel form. The electrolyte layer 84 in a gel form is preferable because not only a high ion conductivity is obtainable, but liquid leakage of the battery can be prevented from occurring. A constitution of the polymer compound is the same as that in the nonaqueous electrolyte battery according to the second embodiment.

(Manufacturing Method of Nonaqueous Electrolyte Battery)

The thus configured nonaqueous electrolyte battery can be, for example, manufactured in the following manner.

First of all, a precursor solution containing a solvent, an electrolyte salt, a polymer compound and a mixed solvent is coated on each of the positive electrode 81 and the negative electrode 82, and the mixed solvent is then vaporized to form the electrolyte layer 84. The nonaqueous electrolyte battery can be obtained by following the same subsequent steps as those in the third embodiment according to the present invention, except that the positive electrode 81 and the negative electrode 82 each having the electrolyte layer 84 formed thereon were used.

<Effect>

The fourth embodiment has the same effects as those in the third embodiment according to the present invention.

<5. Fifth Embodiment>

In a fifth embodiment, a polyacid and/or a polyacid compound is previously added to an electrolytic solution. According to this, the electrolytic solution contains the polyacid and/or the polyacid compound dissolved in a solvent before charge/discharge.

[Polyacid and Polyacid Compound]

The polyacid as referred to herein means a condensate of one or two or more kinds of an oxoacid. It is preferable that this polyacid or polyacid compound has a structure in which a polyacid ion thereof is easily soluble in the solvent of the battery, such as a Keggin structure, an Anderson structure and a Dawson structure. Examples of the polyacid and/or the polyacid compound include polyacids and/or polyacid compounds not having a hetero atom and having one or two or more kinds of polyatoms, such as an isopolyacid and/or an isopolyacid compound having one kind of a polyatom; and a polyacid and/or a polyacid compound having two or more kinds of polyatoms and not having a hetero atom.

Similar to the heteropolyacid and/or a heteropolyacid compound, the polyacid and/or the polyacid compound according to the fifth embodiment is one having a polyatom selected from the following element group (a); or one having a polyatom selected from the following element group (a), in which a part of the polyatoms is substituted with at least any one element selected from the following element group (b).

Element group (a): Mo, W, Nb, V

Element group (b): Ti, Cr, Mn, Fe, Co, Ni, Cu, Zn, Ga, Zr, Tc, Rh, Cd, In, Sn, Ta, Re, Tl, Pb Examples of the polyacid which is used in the fifth embodiment include tungstic(VI) acid and molybdic(VI) acid. Specific examples thereof include tungstic anhydride, molybdic anhydride and hydrates thereof. Examples of the hydrate which can be used include orthotungstic acid ($H_2WO_4$) which is tungstic acid monohydrate ($WO_3 \cdot H_2O$), molybdic acid dihydrate ($H_4MoO_5$, $H_2MoO_4 \cdot H_2O$ or $MoO_3 \cdot 2H_2O$) and orthomolybdic acid ($H_2MoO_4$) which is molybdic acid monohydrate ($MoO_3 \cdot H_2O$). Also, tungstic anhydride ($WO_3$) having a smaller hydrogen content than metatungstic acid, paratungstic acid and the like which are an isopolyacid of the foregoing hydrate, and ultimately having a zero hydrogen content; molybdic anhydride ($MoO_3$) having a smaller hydrogen content than metamolybdic acid, paramolybdic acid and the like, and ultimately having a zero hydrogen content; and the like can be used.

(Behavior of Polyacid and/or Polyacid Compound by Charge)

In the nonaqueous electrolyte battery using an electrolytic solution containing a polyacid and/or a polyacid compound, a coating film derived from the polyacid and/or the polyacid compound is formed on the negative electrode 34 by initial charge or preliminary charge.

That is, the polyacid and/or the polyacid compound is electrolyzed by charge or preliminary charge, whereby a compound derived from the polyacid and/or the polyacid compound is deposited on the surface of the negative electrode 34 to form an inorganic coating film.

Also, the polyacid and/or the polyacid compound in the electrolytic solution is electrolyzed by charge or preliminary charge depending upon the addition amount of the polyacid and/or the polyacid compound, whereby a compound derived from the polyacid and/or the polyacid compound is deposited on the surface of the positive electrode to form an inorganic coating film.

Also, in view of the fact that the electrolytic solution having the polyacid and/or the polyacid compound dissolved therein is impregnated in a negative electrode active material layer, a compound derived from the polyacid and/or the polyacid compound may be deposited within the negative electrode active material layer by charge or preliminary charge. According to this, the compound derived from the polyacid and/or the polyacid compound may exist among negative electrode active material particles.

Also, in view of the fact that the electrolytic solution having the polyacid and/or the polyacid compound dissolved therein is impregnated in a positive electrode active material layer, a compound derived from the polyacid and/or the polyacid compound may be deposited within the positive electrode active material layer by charge or preliminary charge. According to this, the compound derived from the polyacid and/or the polyacid compound may exist among positive electrode active material particles.

The compound derived from the polyacid and/or the polyacid compound include a polyacid and/or a polyacid compound, or a reduced material of a polyacid and/or a polyacid compound, each of which is produced by electrolysis of the polyacid and/or the polyacid compound and which is poorer in solubility than the polyacid and/or the polyacid compound added to the electrolytic solution, or the like.

The presence or absence of the inorganic coating film derived from the polyacid and/or the polyacid compound can be confirmed by disassembling the nonaqueous electrolyte battery after charge or preliminary charge and taking out the positive electrode. For example, when as a result of confirming a composition of the deposit deposited on the positive electrode collector 33A, the polyacid and/or the polyacid compound is deposited, it can be easily supposed that the polyacid and/or the polyacid compound is similarly deposited on the positive electrode active material layer, and it can be confirmed that the inorganic coating film derived from the polyacid and/or the polyacid compound is formed.

The presence or absence of the polyacid and/or the polyacid compound can be, for example, confirmed by the X-ray photoelectron spectroscopy (XPS) analysis or time-of-flight secondary ion mass spectrometry (ToF-SIMS). In that case, the battery is disassembled, followed by washing with dimethyl carbonate. This is made for the purpose of removing a solvent component with low volatility and an electrolyte salt existing on the surface. It is desirable that sampling is carried out in an inert atmosphere if it is at all possible.

As other points are the same as those in the first embodiment, their descriptions are omitted.

MODIFICATION EXAMPLES

While in the foregoing configuration example of the nonaqueous electrolyte battery, an example in which the polyacid and/or the polyacid compound is previously added to the electrolytic solution has been described, the polyacid and/or the polyacid compound may be added to other battery constituent element than the electrolytic solution.

In the following first to third modification examples, configuration examples of a nonaqueous electrolyte battery in which the polyacid and/or the polyacid compound is previously added to other battery constituent element than the electrolytic solution are described. In the following, descriptions are made centering on points which are different from those of the foregoing configuration examples of a nonaqueous electrolyte battery (an example in which the polyacid and/or the polyacid compound is previously added to the electrolytic solution), and descriptions on the same points as in the foregoing configuration examples of a nonaqueous electrolyte battery are properly omitted.

First Modification Example

A first modification example is the same as in the first embodiment, except that the polyacid and/or the polyacid compound is not previously added to the electrolytic solution but added to the positive electrode active material layer 33B.

Second Modification Example

A second modification example is the same as in the first embodiment, except that the polyacid and/or the polyacid compound is not previously added to the electrolytic solution but added to the negative electrode active material layer 34B.

Third Modification Example

A third modification example is the same as in the first embodiment, except that the polyacid and/or the polyacid compound is not previously added to the electrolytic solution, but the polyacid and/or the polyacid compound is previously added to the separator 35.

EXAMPLES

The present embodiments are specifically described below with reference to the following Examples, but it should not be construed that the present invention is limited only to these Examples.

Example 1

A negative electrode was fabricated in the following manner. 90 parts by weight of a pulverized artificial graphite powder and 10 parts by weight of PVDF as a binder were dispersed in N-methyl-2-pyrrolidone to form a slurry, which was then uniformly coated on the both surfaces of a strip-shaped copper foil having a thickness of 10 µm, followed by drying. Subsequently, the resultant was compression molded by a roll press and then cut into a size of 45 mm×650 mm, and a nickel-made negative electrode lead was installed in one end of the copper foil.

A positive electrode was fabricated in the following manner. 91 parts by weight of lithium cobaltate ($LiCoO_2$), 6 parts by weight of graphite as a conductive agent and 10 parts by weight of PVDF as a binder were dispersed in N-methyl-2-pyrrolidone to form a slurry, which was then uniformly coated on a strip-shaped aluminum foil having a thickness of 12 μm, followed by drying. Subsequently, the resultant was compression molded by a roll press and then cut into a size of 43 mm×700 mm to form a positive electrode, and an aluminum-made positive electrode lead was installed in one end of the aluminum foil.

An electrolyte in a gel form was prepared in the following manner. Ethylene carbonate (EC) and propylene carbonate (PC) were mixed in a weight ratio of EC/PC of 1/1 to prepare a mixed solvent, and lithium hexafluorophosphate ($LiPF_6$) was dissolved in a proportion of 1.08 moles/kg in this mixed solvent, thereby preparing a nonaqueous electrolytic solution. Subsequently, silicotungstic acid ($H_4SiW_{12}O_{40}$) as a heteropolyacid was added to and dissolved in the nonaqueous electrolytic solution. The addition amount of silicotungstic acid as the heteropolyacid was regulated to 0.01 parts by mass based on 100 parts by mass of the negative electrode active material. Subsequently, 10 parts by mass of polyvinylidene fluoride copolymerized with hexafluoropropylene (HFP) in a proportion of 6.9% and 90 parts by mass of the nonaqueous electrolytic solution having silicotungstic acid dissolved therein were mixed. Subsequently, aluminum oxide ($Al_2O_3$) as a ceramic powder was added to this solution, and the mixture was stirred for dissolution, thereby obtaining an electrolyte solution in a sol form. The addition amount of $Al_2O_3$ as the ceramic powder was regulated in such a manner that in a battery device after assembling, $Al_2O_3$ was existent in a proportion of 1.5 mg/cm$^2$ per unit area between the positive and negative electrodes. Subsequently, the obtained electrolyte solution in a sol form was uniformly coated on the both surfaces of each of the positive electrode and the negative electrode. Subsequently, the coated solution was dried to remove the solvent, thereby forming a gel electrolyte layer on the both surfaces of each of the position electrode and the negative electrode.

Subsequently, the strip-shaped positive electrode, on the both surfaces of which was formed the gel electrolyte layer, and the strip-shaped negative electrode, on the both surfaces of which was formed the gel electrolyte layer, were laminated via a separator, and the laminate was wound in a longitudinal direction to obtain a flat type battery device.

Example 2

A flat type battery device was obtained in the same manner as in Example 1, except that the addition amount of silicotungstic acid ($H_4SiW_{12}O_{40}$) was regulated to 0.05% by mass.

Example 3

A flat type battery device was obtained in the same manner as in Example 1, except that the addition amount of silicotungstic acid ($H_4SiW_{12}O_{40}$) was regulated to 0.10% by mass.

Example 4

A flat type battery device was obtained in the same manner as in Example 1, except that the addition amount of silicotungstic acid ($H_4SiW_{12}O_{40}$) was regulated to 0.50% by mass.

Example 5

A flat type battery device was obtained in the same manner as in Example 1, except that the addition amount of silicotungstic acid ($H_4SiW_{12}O_{40}$) was regulated to 1.00% by mass.

Example 6

A flat type battery device was obtained in the same manner as in Example 1, except that the addition amount of silicotungstic acid ($H_4SiW_{12}O_{40}$) was regulated to 1.50% by mass.

Example 7

A flat type battery device was obtained in the same manner as in Example 1, except that the addition amount of silicotungstic acid ($H_4SiW_{12}O_{40}$) was regulated to 2.00% by mass.

Example 8

A flat type battery device was obtained in the same manner as in Example 1, except that the addition amount of silicotungstic acid ($H_4SiW_{12}O_{40}$) was regulated to 3.00% by mass.

Example 9

A flat type battery device was obtained in the same manner as in Example 1, except that the addition amount of silicotungstic acid ($H_4SiW_{12}O_{40}$) was regulated to 5.00% by mass.

Example 10

A flat type battery device was obtained in the same manner as in Example 1, except that the addition amount of silicotungstic acid ($H_4SiW_{12}O_{40}$) was regulated to 7.00% by mass.

Example 11

A flat type battery device was obtained in the same manner as in Example 3, except that zirconium oxide ($ZrO_2$) was used as the ceramic powder.

Example 12

A flat type battery device was obtained in the same manner as in Example 4, except that zirconium oxide ($ZrO_2$) was used as the ceramic powder.

Example 13

A flat type battery device was obtained in the same manner as in Example 5, except that zirconium oxide ($ZrO_2$) was used as the ceramic powder.

Example 14

A flat type battery device was obtained in the same manner as in Example 9, except that zirconium oxide ($ZrO_2$) was used as the ceramic powder.

Examples 15 to 18

Flat type battery devices were obtained in the same manners as in Examples 11 to 14, respectively, except that titanium oxide ($TiO_2$) was used as the ceramic powder.

Examples 19 to 22

Flat type battery devices were obtained in the same manners as in Examples 11 to 14, respectively, except that magnesium oxide (MgO) was used as the ceramic powder.

Examples 23 to 26

Flat type battery devices were obtained in the same manners as in Examples 11 to 14, respectively, except that phosphomolybdic acid ($H_3PMo_{12}O_{40}$) was used as the heteropolyacid.

Examples 27 to 30

Flat type battery devices were obtained in the same manners as in Examples 11 to 14, respectively, except that silicomolybdic acid ($H_4SiMo_{12}O_{40}$) was used as the heteropolyacid.

Comparative Example 1

A flat type battery device was obtained in the same manner as in Example 1, except that neither the ceramic powder nor the heteropolyacid was added.

Comparative Examples 2 to 11

Flat type battery devices were obtained in the same manners as in Examples 1 to 10, respectively, except that the ceramic powder was not added.

Comparative Example 12

A flat type battery device was obtained in the same manner as in Example 1, except that the heteropolyacid was not added.

(Blister Evaluation)

With respect to each of the thus obtained flat type battery devices of Examples 1 to 30 and Comparative Examples 1 to 12, the device blister was evaluated in the following manner. First of all, a thickness of the battery device before a cycle test was measured. Subsequently, after a cycle of charging the battery device to 4.2 V with 1 C and then discharging it to 2.5 V with 1 C or 2 C was repeated 1,000 cycles in an atmosphere at 60° C., the thickness of the battery device was measured. Subsequently, a blister amount of the battery device after 1,000 cycles was determined from the thus measured thicknesses of the battery device before and after the cycle test as determined in the foregoing manner. The results are shown in Table 1. The term "1 C" is a current value at which a theoretical capacity can be released for one hour.

(Low-Temperature Characteristic)

With respect to each of the thus obtained flat type battery devices of Examples 1 to 30 and Comparative Examples 1 to 12, a low-temperature characteristic was evaluated in the following manner. By defining a discharge capacity at 23° C. at the time of charging the battery device to 4.2 V with 1 C and then discharging it to 2.5 V with 1 C as 100 and determining a capacity retention rate at the time of performing the same test at −20° C., the low-temperature characteristic was evaluated. The results are shown in Table 1.

(Evaluation of Negative Electrode Surface)

With respect to the thus obtained flat type battery device of Example 5, a state of the negative electrode surface was evaluated in the following manner. First of all, a cycle of charging the battery device to 4.2 V with 1 C and then discharging it to 2.5 V with 1 C was repeated 1,000 cycles in an atmosphere at 60° C. Thereafter, the battery device was disassembled, thereby taking out the negative electrode. Subsequently, as a result of observing this negative electrode surface, an amorphous coating film in a gel form was formed on the negative electrode surface. This negative electrode was washed and then dried. As a result, a structure shown in FIG. 10 was confirmed.

With respect to the thus obtained flat type battery device of Comparative Example 1, the same evaluation as in Example 5 was performed. As a result, it was noted that an amorphous coating film in a gel form was not formed on the negative electrode surface.

It was noted from the foregoing that the coating film in a gel form produced on the negative electrode is related to revealment of the blister suppressing effect of battery device.

Table 1 shows the configuration of each of the flat type battery devices of Examples 1 to 30 and Comparative Examples 1 to 12 and evaluation results thereof

TABLE 1

| Battery | Ceramic powder | Heteropolyacid or heteropolyacid compound | Heteropolyacid/ heteropolyacid compound [% by mass] | Device blister amount after 1,000 cycles 1 C [mm] | Device blister amount after 1,000 cycles 2 C [mm] | Low-temperature characteristic [%] |
|---|---|---|---|---|---|---|
| Example 1  | $Al_2O_3$ | $H_4SiW_{12}O_{40}$ | 0.01 | 0.6 | 0.9 | 61.29 |
| Example 2  | $Al_2O_3$ | $H_4SiW_{12}O_{40}$ | 0.05 | 0.3 | 0.8 | 59.45 |
| Example 3  | $Al_2O_3$ | $H_4SiW_{12}O_{40}$ | 0.10 | 0.3 | 0.8 | 62.28 |
| Example 4  | $Al_2O_3$ | $H_4SiW_{12}O_{40}$ | 0.50 | 0.2 | 0.4 | 62.86 |
| Example 5  | $Al_2O_3$ | $H_4SiW_{12}O_{40}$ | 1.00 | 0.2 | 0.3 | 61.92 |
| Example 6  | $Al_2O_3$ | $H_4SiW_{12}O_{40}$ | 1.50 | 0.2 | 0.2 | 61.87 |
| Example 7  | $Al_2O_3$ | $H_4SiW_{12}O_{40}$ | 2.00 | 0.1 | 0.2 | 61.75 |
| Example 8  | $Al_2O_3$ | $H_4SiW_{12}O_{40}$ | 3.00 | 0.1 | 0.1 | 60.48 |
| Example 9  | $Al_2O_3$ | $H_4SiW_{12}O_{40}$ | 5.00 | 0.1 | 0.1 | 59.87 |
| Example 10 | $Al_2O_3$ | $H_4SiW_{12}O_{40}$ | 7.00 | 0.1 | 0.1 | 48.80 |
| Example 11 | $ZrO_2$ | $H_4SiW_{12}O_{40}$ | 0.10 | 0.3 | 0.8 | 59.86 |
| Example 12 | $ZrO_2$ | $H_4SiW_{12}O_{40}$ | 0.50 | 0.2 | 0.3 | 60.95 |
| Example 13 | $ZrO_2$ | $H_4SiW_{12}O_{40}$ | 1.00 | 0.2 | 0.3 | 61.22 |
| Example 14 | $ZrO_2$ | $H_4SiW_{12}O_{40}$ | 5.00 | 0.1 | 0.1 | 59.73 |
| Example 15 | $TiO_2$ | $H_4SiW_{12}O_{40}$ | 0.10 | 0.4 | 0.9 | 60.65 |
| Example 16 | $TiO_2$ | $H_4SiW_{12}O_{40}$ | 0.50 | 0.2 | 0.4 | 60.86 |
| Example 17 | $TiO_2$ | $H_4SiW_{12}O_{40}$ | 1.00 | 0.2 | 0.3 | 61.22 |
| Example 18 | $TiO_2$ | $H_4SiW_{12}O_{40}$ | 5.00 | 0.1 | 0.2 | 58.54 |
| Example 19 | MgO | $H_4SiW_{12}O_{40}$ | 0.10 | 0.3 | 0.9 | 57.89 |
| Example 20 | MgO | $H_4SiW_{12}O_{40}$ | 0.50 | 0.3 | 0.3 | 60.03 |
| Example 21 | MgO | $H_4SiW_{12}O_{40}$ | 1.00 | 0.2 | 0.3 | 59.97 |
| Example 22 | MgO | $H_4SiW_{12}O_{40}$ | 5.00 | 0.1 | 0.1 | 60.11 |

TABLE 1-continued

| Battery | Ceramic powder | Heteropolyacid or heteropolyacid compound | Heteropolyacid/ heteropolyacid compound [% by mass] | Device blister amount after 1,000 cycles 1 C [mm] | Device blister amount after 1,000 cycles 2 C [mm] | Low-temperature characteristic [%] |
|---|---|---|---|---|---|---|
| Example 23 | $Al_2O_3$ | $H_3PMo_{12}O_{40}$ | 0.10 | 0.4 | 0.8 | 56.58 |
| Example 24 | $Al_2O_3$ | $H_3PMo_{12}O_{40}$ | 0.50 | 0.3 | 0.5 | 59.37 |
| Example 25 | $Al_2O_3$ | $H_3PMo_{12}O_{40}$ | 1.00 | 0.3 | 0.4 | 59.54 |
| Example 26 | $Al_2O_3$ | $H_3PMo_{12}O_{40}$ | 5.00 | 0.2 | 0.2 | 60.01 |
| Example 27 | $Al_2O_3$ | $H_4SiMo_{12}O_{40}$ | 0.10 | 0.3 | 0.8 | 60.10 |
| Example 28 | $Al_2O_3$ | $H_4SiMo_{12}O_{40}$ | 0.50 | 0.2 | 0.4 | 61.42 |
| Example 29 | $Al_2O_3$ | $H_4SiMo_{12}O_{40}$ | 1.00 | 0.2 | 0.3 | 62.03 |
| Example 30 | $Al_2O_3$ | $H_4SiMo_{12}O_{40}$ | 5.00 | 0.1 | 0.1 | 62.24 |
| Comparative Example 1 | — | — | — | 1.0 | 1.5 | — |
| Comparative Example 2 | — | $H_4SiW_{12}O_{40}$ | 0.01 | 0.9 | 1.3 | — |
| Comparative Example 3 | — | $H_4SiW_{12}O_{40}$ | 0.05 | 0.7 | 1.2 | — |
| Comparative Example 4 | — | $H_4SiW_{12}O_{40}$ | 0.10 | 0.7 | 1.2 | — |
| Comparative Example 5 | — | $H_4SiW_{12}O_{40}$ | 0.50 | 0.6 | 1.0 | — |
| Comparative Example 6 | — | $H_4SiW_{12}O_{40}$ | 1.00 | 0.6 | 1.0 | — |
| Comparative Example 7 | — | $H_4SiW_{12}O_{40}$ | 1.50 | 0.6 | 0.9 | — |
| Comparative Example 8 | — | $H_4SiW_{12}O_{40}$ | 2.00 | 0.5 | 0.9 | — |
| Comparative Example 9 | — | $H_4SiW_{12}O_{40}$ | 3.00 | 0.5 | 0.8 | — |
| Comparative Example 10 | — | $H_4SiW_{12}O_{40}$ | 5.00 | 0.5 | 0.8 | — |
| Comparative Example 11 | — | $H_4SiW_{12}O_{40}$ | 7.00 | 0.5 | 0.8 | — |
| Comparative Example 12 | $Al_2O_3$ | — | — | 0.8 | 1.2 | 58.75 |

The following can be noted in the results shown in Table 1.

In the battery devices of Examples 1 to 10 and Comparative Examples 2 to 11 each containing the ceramic powder in the gel electrolyte, the device blister amount is small as compared with the battery device of Comparative Example 1 not containing the ceramic powder in the gel electrolyte.

In the battery devices of Examples 1 to 10 each containing the ceramic powder and the heteropolyacid in the gel electrolyte, the device blister amount is smaller. Also, in the battery devices of Examples 1 to 10, the device blister amount tends to reduce with an increase of the content of the heteropolyacid. Specifically, in the battery device of Example 1 in which the content of the heteropolyacid is 0.01 parts by mass, the device blister amount is 0.6 mm, and in the battery devices of Examples 2 to 10 in which the content of the heteropolyacid is from 0.05 to 7.00 parts by mass, the device blister amount is not more than 0.3 mm. However, in Example 10 in which the content of the heteropolyacid is 7.00% or more, there is a tendency that the low-temperature characteristic is lowered.

From the evaluation results of Examples 11 to 22, it is noted that even in the case of using other ceramic powder than aluminum oxide ($Al_2O_3$), substantially the same device blister suppressing effect as in the case of using aluminum oxide ($Al_2O_3$) is revealed.

From the evaluation results of Examples 23 to 30, it is noted that even in the case of using other heteropolyacid than silicotungstic acid ($H_4SiW_{12}O_{40}$), substantially the same device blister suppressing effect as in the case of using silicotungstic acid ($H_4SiW_{12}O_{40}$) is revealed.

From the evaluation results of Examples 1 to 10 and Comparative Examples 1 to 12, it is noted that by using a combination of the ceramic powder and the heteropolyacid, a synergistic effect is revealed. It may be supposed that such a synergistic effect is revealed according to the following matter. That is, it may be considered that the heteropolyacid compound forms a coating film on the negative electrode surface through repetition of charge/discharge, so that the device blister to be caused due to the cycles can be suppressed. It may be considered that when the ceramic powder is added to the gel electrolyte layer, since the negative electrode surface is uniformly covered by the ceramic powder, a more stable coating film containing the polyacid or the polyacid compound is formed, so that the device blister to be caused due to the cycles can be more suppressed.

The constitutions, methods, shapes, materials, numerical values and so on given in the foregoing embodiments are merely an example to the bitter end, and different constitutions, methods, shapes, materials, numerical values and so on may be adopted, if desired.

Also, the respective constitutions of the foregoing embodiments can be combined with each other so far as the gist is not deviated.

Also, while in the foregoing embodiments, examples ar applied to the batteries having a wound structure have been described. However, the structure may include a positive electrode and a negative electrode folded, a structure in which a positive electrode and a negative electrode are piled up, or the like.

Also, while in the foregoing embodiments, the examples are applied to batteries having a cylindrical type or a flat type, the shape of the battery is not limited thereto. The present embodiments may also be applicable to batteries of a coin type, a button type, a rectangular type and so on.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte battery, the battery comprising:
   a positive electrode;
   a negative electrode; and
   an electrolyte,
   wherein the electrolyte contains a nonaqueous solvent, an electrolyte salt, a matrix polymer and a ceramic powder, and further contains at least one of an polyacid and a polyacid compound selected from the group consisting of phosphomolybdic acid, silicomolybdic acid, silicotungstic acid, a phosphomolybdic acid compound, a silicomolybdic acid compound and a silicotungstic acid compound, wherein the electrolyte is impregnated in a negative electrode active material layer contained in the negative electrode, wherein a content of the at least one of the polyacid and the polyacid compound in the electrolyte is 0.01 by mass to 5.0 by mass of the negative electrode active material contained in the negative electrode, and wherein the ceramic powder contains at least one member selected from the group consisting of $Al_2O_3$, $ZrO_2$, $TiO_2$ and MgO.

2. The nonaqueous electrolyte battery according to claim 1, wherein
at least one of the polyacid and the polyacid compound is at least one member selected from the group consisting of silicomolybdic acid, silicotungstic acid, a slicomolybdic acid compound and a silicotungstic acid compound.

3. The nonaqueous electrolyte battery according to claim 1, wherein the polyacid or the polyacid compound is further deposited on at least a part of the surface of the positive electrode.

4. The nonaqueous electrolyte battery according to claim 1, wherein
an amount of the ceramic powder per unit area between the positive and negative electrodes is 0.6 $mg/cm^2$ or more and not more than 3.5 $mg/cm^2$.

5. The nonaqueous electrolyte battery according to claim 1, wherein the ceramic powder has a Brunauer-Emmett-Teller (BET) specific surface area of from 0.5 to 11 $m^2/g$.

6. The nonaqueous electrolyte battery according to claim 1, wherein
the ceramic powder is further coated on the surface of at least a part of the positive electrode.

7. The nonaqueous electrolyte battery according to claim 1, wherein
a content ratio of the ceramic powder and the matrix polymer is 1/1 or more and not more than 5/1 in terms of a mass ratio.

8. The nonaqueous electrolyte battery according to claim 1, wherein
the ceramic powder has a particle size distribution of a gauss distribution.

9. The nonaqueous electrolyte battery according to claim 1, wherein the polyacid and the polyacid compound are each electrolyzed so as to be rendered amorphous.

10. A nonaqueous electrolyte battery, the battery comprising:
a positive electrode;
a negative electrode; and
an electrolyte;
wherein the electrolyte contains a nonaqueous solvent, an electrolyte salt, a matrix polymer and a ceramic powder, and
a coating film in a gel form containing at least one of a polyacid and a polyacid compound selected from the group consisting of phosphomolybdic acid, silicomolybdic acid, silicotungstic acid, a phosphomolybdic acid compound, a silicomolybdic acid compound and a silicotungstic acid compound, and further containing ceramic powder is formed on the surface of at least a part of the negative electrode, a content of the at least one of the polyacid and the polyacid compound is in the electrolyte is 0.01 % by mass 5.0 % by mass of the coating film, and the ceramic powder contains at least one member selected from the group consisting of $Al_2O_3$, $ZrO_2$, $TiO_2$ and MgO.

11. The nonaqueous electrolyte battery according to claim 10, wherein
the ceramic powder has a Brunauer-Emmett-Teller (BET) specific surface area of from 0.5 to 11 $m^2/g$.

12. The nonaqueous electrolyte battery according to claim 10, wherein
the coating film is further formed on the surface of at least a part of the positive electrode.

13. The nonaqueous electrolyte battery according to claim 10, wherein
a content ratio of the ceramic powder and the matrix polymer is 1/1 or more and not more than 5/1 in terms of a mass ratio.

14. The nonaqueous electrolyte battery according to claim 10, wherein
an amount of the ceramic powder per unit area between the positive and negative electrodes is 0.6 $mg/cm^2$ or more and not more than 3.5 $mg/cm^2$.

15. The nonaqueous electrolyte battery according to claim 10, wherein the polyacid and the polyacid compound are each electrolyzed so as to be rendered amorphous.

16. The nonaqueous electrolyte battery according to claim 10, wherein at least one of the amorphous polyacid and the amorphous polyacid compound is at least one member selected from the group consisting of silicomolybdic acid, silicotungstic acid, a silicomolybdic acid compound and a silicotungstic acid compound.

* * * * *